United States Patent [19]

Nishikawa et al.

[11] Patent Number: 5,408,607
[45] Date of Patent: Apr. 18, 1995

[54] INFORMATION TRANSFER SYSTEM

[75] Inventors: Mitsuyo Nishikawa, Hitachi; Hiromi Inaba, Katsuta; Kiyoshi Nakamura, Katsuta; Takashi Kaneko, Katsuta; Tokio Maebara, Mito, all of Japan

[73] Assignee: Hitachi, ltd., Tokyo, Japan

[21] Appl. No.: 672,118

[22] Filed: Mar. 19, 1991

[30] Foreign Application Priority Data

Mar. 19, 1990 [JP] Japan .................... 2-68749
Sep. 10, 1990 [JP] Japan .................... 2-239746
Nov. 29, 1990 [JP] Japan .................... 2-332962

[51] Int. Cl.⁶ .................... G06F 15/16; G06F 15/46
[52] U.S. Cl. .................... 395/200; 364/505; 364/550
[58] Field of Search .................... 364/133, 134, 551.01, 364/505, 506, 550; 395/325, 200; 340/825.06, 825.07

[56] References Cited

U.S. PATENT DOCUMENTS 4,432,064 2/1984 Barker et al. .................... 364/550
4,471,425 9/1984 Yamaguchi et al. .................... 395/325
4,494,186 1/1985 Goss et al. .................... 364/200
4,535,401 8/1985 Penn .................... 340/825.06
4,691,280 9/1987 Bennett .................... 395/325

Primary Examiner—Michael Zanelli
Attorney, Agent, or Firm—Antonelli, Terry, Stout & Kraus

[57] ABSTRACT

An information transfer system in which an information transfer control arrangement including information transfer control and reference information storage is provided in a system having at least three subsystems communicating with each other using transfer information which contains an information unit common to all information handled by the subsystems. The information transfer control refers to information in the reference information storage, and rearranges the information arrangement from the transferer subsystem to an information arrangement suitable for the transferee subsystem, if necessary, followed by transferring it. The subsystem can be changed easily by adding, deleting or correcting the reference information in the reference information storage. The configuration of the transfer control system is therefore flexible.

28 Claims, 42 Drawing Sheets

FIG.3

| SUBSYSTEM NAME | ○○○○○○ | ◇◇◇◇◇◇ | △△△△△△ |
|---|---|---|---|
| SYMBOLS | MM | CO | BC |

FIG.4

| TRANSFERER / TRANSFEREE | MM | CO | BC |
|---|---|---|---|
| MM | | 0 | 0 |
| CO | 0 | | 1 |
| BC | 1 | 0 | |

(1:TRANSFERRED 0:NON-TRANSFERRED)

FIG.5

| TRANSFERER SUBSYSTEM | WHEN | WHERE | WHO | WHAT | WHY | HOW |
|---|---|---|---|---|---|---|
| MM | 1 | 1 | 1 | 0 | 0 | 1 |
| ......... | ......... | ......... | ......... | ......... | ......... | ......... |

(1:PRESENCE OF INFORMATION 0:ABSENCE OF INFORMATION)

FIG.6

| TRANSFEREE SUBSYSTEM | WHEN | WHERE | WHO | WHAT | WHY | HOW |
|---|---|---|---|---|---|---|
| BC | 1 | 1 | 0 | 0 | 0 | 1 |
| ......... | ......... | ......... | ......... | ......... | ......... | ......... |

FIG.9

| SUBSYSTEM NAME | BUILDING CONTROL | COUNTING SERVICE | FUNCTION SUPPORT | MEETING ROOM MANAGEMENT | SECRETARY SUPPORT | GUIDANCE SERVICE | DOOR SUPERVISION |
|---|---|---|---|---|---|---|---|
| SYMBOLS | BC | CS | FS | MM | SS | GS | DS |

FIG.10

| TRANSFERER / TRANSFEREE | BC | CS | FS | MM | SS | GS | DS |
|---|---|---|---|---|---|---|---|
| BC |  | 0 | 0 | 1 | 1 | 0 | 1 |
| CS | 1 |  | 0 | 1 | 0 | 0 | 0 |
| FS | 1 | 1 |  | 0 | 0 | 0 | 0 |
| MM | 0 | 0 | 0 |  | 1 | 0 | 0 |
| SS | 0 | 0 | 0 | 0 |  | 1 | 0 |
| GS | 0 | 0 | 0 | 1 | 0 |  | 0 |
| DS | 0 | 0 | 0 | 0 | 0 | 0 |  |

(1:TRANSFERRED 0:NON-TRANSFERRED)

FIG.11

| TRANSFERER SUBSYSTEM | WHEN | WHERE | WHO | WHAT | WHY | HOW |
|---|---|---|---|---|---|---|
| BC | DATE OF USE | USED FACILITY | USED NAME | QUANTITY OF USE | — | — |
| CS | — | — | — | — | — | — |
| FS | — | — | — | — | — | — |
| MM | DATE OF USE | USED FACILITY | USED NAME | — | — | RESERVED /CANCELED |
| SS | SCHEDULED DATE | USED FACILITY | DIRECTOR NAME | — | — | RESERVED /CANCELED |
| GS | — | — | — | — | — | — |
| DS | OPERATED TIME | OPERATED DOOR | OPERATOR NAME | — | — | OPEN /CLOSED |

| TRANSFERER SUBSYSTEM | WHEN | WHERE | WHO | WHAT | WHY | HOW |
|---|---|---|---|---|---|---|
| BC | 1 | 1 | 1 | 1 | 0 | 0 |
| CS | 0 | 0 | 0 | 0 | 0 | 0 |
| FS | 0 | 0 | 0 | 0 | 0 | 0 |
| MM | 1 | 1 | 1 | 0 | 0 | 1 |
| SS | 1 | 1 | 1 | 0 | 0 | 1 |
| GS | 0 | 0 | 0 | 0 | 0 | 0 |
| DS | 1 | 1 | 1 | 0 | 0 | 1 |

(1:PRESENCE OF INFORMATION 0:ABSENCE OF INFORMATION)

FIG.12

| TRANSFEREE SUBSYSTEM | WHEN | WHERE | WHO | WHAT | WHY | HOW |
|---|---|---|---|---|---|---|
| BC | DATE OF USE | USED FACILITY | — | — | — | START /STOP |
| CS | DATE OF USE | USED FACILITY | USED NAME | QUANTITY OF USE | — | — |
| FS | DATE OF USE | USED FACILITY | USED NAME | — | — | — |
| MM | SCHEDULED DATE | — | — | — | — | RESERVED /CANCELED |
| SS | — | — | — | — | — | — |
| GS | DATE OF USE | USED FACILITY | SPONSOR NAME | KINDS OF GUIDE | — | — |
| DS | DATE OF USE | OPERATED DOOR | OPERATOR NAME | — | — | OPEN /CLOSED |

| TRANSFEREE SUBSYSTEM | WHEN | WHERE | WHO | WHAT | WHY | HOW |
|---|---|---|---|---|---|---|
| BC | 1 | 1 | 0 | 0 | 0 | 1 |
| CS | 1 | 1 | 1 | 1 | 0 | 0 |
| FS | 1 | 1 | 1 | 0 | 0 | 0 |
| MM | 1 | 0 | 0 | 0 | 0 | 1 |
| SS | 0 | 0 | 0 | 0 | 0 | 0 |
| GS | 1 | 1 | 1 | 1 | 0 | 0 |
| DS | 1 | 1 | 1 | 0 | 0 | 1 |

(1:PRESENCE OF INFORMATION 0:ABSENCE OF INFORMATION)

FIG.17

INFORMATION TABLE 2

| STORAGE AREA FOR MEETING ROOM MANAGEMENT | STORAGE AREA FOR DOOR SUPERVISION | STORAGE AREA FOR BUILDING CONTROL |

FIG.24

SET 1 OR 0 IN TABLE TO PRESET TRANSFEREE

| SOURCE<br>TRANSFEREE | SUBSYSTEM 1 | --- | SUBSYSTEM n | TERMINAL<br>UNIT 1 | --- | TERMINAL<br>UNIT n |
|---|---|---|---|---|---|---|
| SUBSYSTEM 1 |  | 1 OR 0 | 0 | 1 OR 0 | 1 OR 0 | 1 OR 0 |
| --- | 1 OR 0 |  | 1 OR 0 | 1 OR 0 | 1 OR 0 | 1 OR 0 |
| SUBSYSTEM n | 0 | 1 OR 0 |  | 0 | 1 OR 0 | 0 |
| TERMINAL<br>UNIT 1 | 1 OR 0 | 1 OR 0 | 1 |  | 1 OR 0 | 1 |
| --- | 1 | 1 OR 0 | 0 | 1 OR 0 |  | 1 OR 0 |
| TERMINAL<br>UNIT n | 1 OR 0 | 1 OR 0 | 0 | 1 | 1 OR 0 |  |

(1:TRANSFEREE 0:NON-TRANSFEREE)

FIG.27

| TRANSFERER / TRANSFEREE | BC | CS | FS | MM | SS | GS | DS |
|---|---|---|---|---|---|---|---|
| BC |   | 0 | 0 | 1 | 1 | 0 | 1 |
| CS | 1 |   | 0 | 1 | 0 | 0 | 0 |
| FS | 1 | 0 |   | 0 | 0 | 0 | 0 |
| MM | 0 | 0 | 0 |   | 1 | 0 | 0 |
| SS | 0 | 0 | 0 | 0 |   | 0 | 0 |
| GS | 0 | 0 | 0 | 1 | 1 |   | 0 |
| DS | 0 | 0 | 0 | 1 | 0 | 0 |   |

(1:TRANSFERRED 0:NON-TRANSFERRED)

FIG.29

SETTING OF TRANSFER INFORMATION

WHICH TABLE IS CORRECTED ? (1:ENABLE 2:EXECUTION 3:END) ?

| TRANSFERER<br>TRANSFEREE | MM | GS | BC |
|---|---|---|---|
| MM | | - | - |
| GS | 0 | | 1 |
| BC | 1 | - | |

0:NOT YET EXECUTED ⎤ ENABLE
1:EXECUTED           ⎦
-:UNABLE

FIG.30

SETTING OF TRANSFER INFORMATION

WHICH TABLE IS CORRECTED ? (1:ENABLE 2:EXECUTION 3:END) ? 1

INPUT PASSWORD. ○◇△□

CORRECT FOLLOWING TABLE.

( 「-」 → 「0」 OR 「0」, 「1」 → 「-」 )

| TRANSFEREE \ TRANSFERER | MM | GS | BC |
|---|---|---|---|
| MM |  | - | - |
| GS | 0 |  | - |
| BC | 1 | 1 |  |

0:NOT YET EXECUTED ⎤ENABLE
1:EXECUTED ⎦
-:UNABLE

FIG.31

SETTING OF TRANSFER INFORMATION

WHICH TABLE IS CORRECTED ? (1:ENABLE 2:EXECUTION 3:END) ? 2

CORRECT FOLLOWING TABLE.

( 「0」 → 「1」 OR 「1」 → 「0」 )

| TRANSFERER / TRANSFEREE | MM | GS | BC |
|---|---|---|---|
| MM | | - | - |
| GS | 0 | | - |
| BC | 1 | 1 | |

0:NOT YET EXECUTED ─┐
1:EXECUTED ─────────┴ ENABLE
-:UNABLE

FIG.32

SETTING OF TRANSFER INFORMATION

WHICH TABLE IS CORRECTED ? (1:ENABLE 2:EXECUTION 3:END) ?

(ENABLE)

| TRANSFEREE \ TRANSFERER | MM | GS | BC |
|---|---|---|---|
| MM | | 0 | 0 |
| GS | 1 | | 1 |
| BC | 1 | 0 | |

0:UNABLE
1:ENABLE (EXECUTION)

| TRANSFEREE \ TRANSFERER | MM | GS | BC |
|---|---|---|---|
| MM | | 0 | 0 |
| GS | 0 | | 1 |
| BC | 1 | 0 | |

0:NOT YET EXECUTED
1:EXECUTED

SETTING OF TRANSFER INFORMATION

WHICH TABLE IS CORRECTED ? (1:ENABLE 2:EXECUTION 3:END) ? 1

INPUT PASSWORD.

CORRECT FOLLOWING TABLE.

( 「0」 → 「1」 OR 「1」 → 「0」 )

(ENABLE)

| TRANSFERER<br>TRANSFEREE | MM | GS | BC |
|---|---|---|---|
| MM | | 1 | 0 |
| GS | 1 | | 1 |
| BC | 1 | 0 | |

0:UNABLE
1:ENABLE (EXECUTION)

| TRANSFERER<br>TRANSFEREE | MM | GS | BC |
|---|---|---|---|
| MM | | 0 | 0 |
| GS | 0 | | 1 |
| BC | 1 | 0 | |

0:NOT YET EXECUTED
1:EXECUTED

FIG.34

SETTING OF TRANSFER INFORMATION

WHICH TABLE IS CORRECTED ? (1:ENABLE 2:EXECUTION 3:END) ? 2

CORRECT FOLLOWING TABLE.

( 「0」 → 「1」 OR 「1」 → 「0」 )

(ENABLE)

| TRANSFEREE \ TRANSFERER | MM | GS | BC |
|---|---|---|---|
| MM | | 0 | 0 |
| GS | 1 | | 1 |
| BC | 1 | 0 | |

0:UNABLE
1:ENABLE (EXECUTION)

| TRANSFEREE \ TRANSFERER | MM | GS | BC |
|---|---|---|---|
| MM | | 0 | 0 |
| GS | 0 | | 1 |
| BC | 1 | 0 | |

0:NOT YET EXECUTED
1:EXECUTED

FIG.35

SETTING OF TRANSFER INFORMATION
WHICH TABLE IS CORRECTED ? (1:ENABLE 2:EXECUTION 3:END) ? 」

FIG.36

SETTING OF TRANSFER INFORMATION

WHICH TABLE IS CORRECTED ? (1:ENABLE 2:EXECUTION 3:END) ? 1

INPUT PASSWORD. ○◇△□

(TRANSFERER SUBSYSTEM)

MM:MEETING ROOM MANAGEMENT
GS:GUIDANCE SERVICE
BS:BUILDING CONTROL

WHAT IS TRANSFERER SUBSYSTEM ? MM (TRANSFERER SUBSYSTEM)

GS:GUIDANCE SERVICE ; ENABLE(1)
BS:BUILDING CONTROL ; ENABLE(1)

WHAT IS TRANSFEREE SUBSYSTEM ? GS

HOW DO YOU CORRECT IT (0:UNABLE 1:ENABLE) ? 0

FIG.37

SETTING OF TRANSFER INFORMATION

WHICH TABLE IS CORRECTED ? (1:ENABLE 2:EXECUTION 3:END) ? 2

(TRANSFERER SUBSYSTEM)

MM:MEETING ROOM MANAGEMENT
GS:GUIDANCE SERVICE
BS:BUILDING CONTROL

WHAT IS TRANSFERER SUBSYSTEM ? iMMi (TRANSFERER SUBSYSTEM)

GS:GUIDANCE SERVICE ; NOT YET EXECUTED(0)
BS:BUILDING CONTROL ; EXECUTED(1)

WHAT IS TRANSFEREE SUBSYSTEM ? iGSi

HOW DO YOU CORRECT IT (0:NOT YET EXECUTED 1:EXECUTED) ? 1

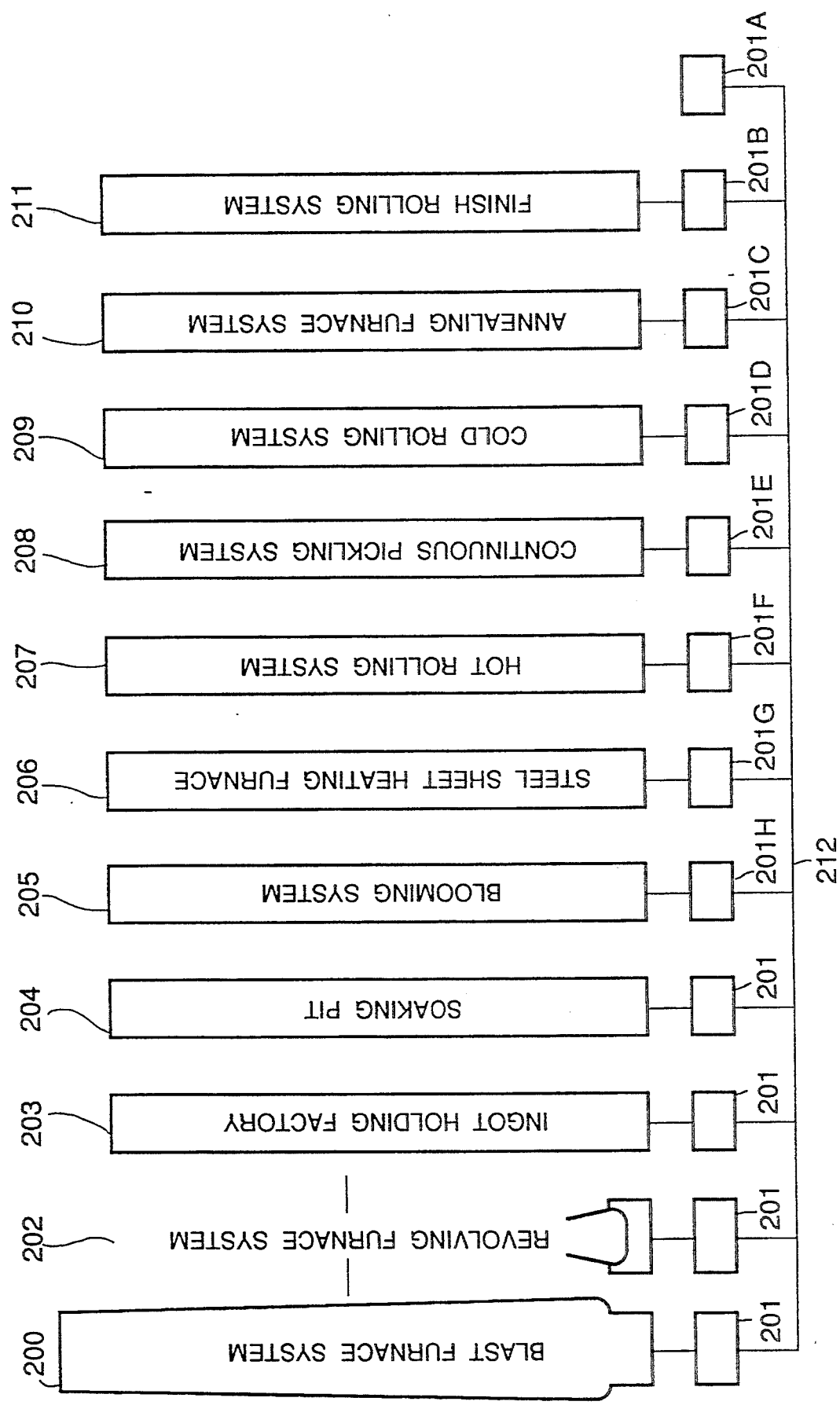

FIG.43

| PATTERN CODE | WHEN | WHERE | WHO | WHAT | WHY | HOW |
|---|---|---|---|---|---|---|
| X31 | 1 | 1 | 0 | 0 | 0 | 1 |
| X38 | 1 | 1 | 1 | 0 | 0 | 0 |
| X39 | 1 | 1 | 1 | 0 | 0 | 1 |
| X3C | 1 | 1 | 1 | 1 | 0 | 0 |

(1:PRESENCE OF INFORMATION 0:ABSENCE OF INFORMATION)

FIG.44

| TRANSFERER / TRANSFEREE | X31 | X38 | X39 | X3C |
|---|---|---|---|---|
| X31 | | - | - | - |
| X38 | - | | - | - |
| X39 | - | 1 | | 1 |
| X3C | - | - | 1 | |

(1:TRANSFERRED -:NON TRANSFERRED)

FIG.45

| PATTERN CODE | REGISTERED SUBSYSTEM |
|---|---|
| X31 | SUBSYSTEM 1, SUBSYSTEM 7 |
| X38 | SUBSYSTEM 2 |
| X39 | SUBSYSTEM 4, SUBSYSTEM 6 |
| X3C | SUBSYSTEM 5, SUBSYSTEM 3 |

INFORMATION TRANSFER SYSTEM

BACKGROUND OF THE INVENTION

1. Field of the Invention

The present invention relates to information transfer in a system comprising at least three subsystems, and more particularly to an information transfer system suitable for use in various management and/or control systems such as a building control (supervisory) system, a steel production system, or a train operation management/control system.

2. Description of the Prior Art

Japanese Patent Laid-Open No. 64-32597 and No. 1-135290 disclose such a centralized control system wherein a centralized control unit has input and output terminals for external signals and contact signals, and the system includes a means capable of operating and stopping all equipment connected to the system based on the external signals and also of indicating these states of operated/stopped conditions of the equipment to the exterior, without actuating the centralized control unit.

Recently, the main types of management/control systems have been distributed ones aiming to achieve fine monitor control and reduce the burden on a central processing unit.

Japanese Patent Laid-Open No. 64-30397 discloses information transfer processing for distributed systems, inclusive of interlock (cooperation) processing. This prior art describes a control system comprising a central processing unit, a plurality of equipment control units and a plurality of monitor control units for the purpose of interlock processing. The central processing unit has a data management means for managing correspondence between the interlocked control processes, and an interlock data output means for outputting interlock data, whereas the monitor control unit has an individual identification means.

Meanwhile, as represented by office automation (OA), there has also been proposed an integrated system with various business support systems, business management systems and so forth connected, as subsystems, to a central processing unit. Along these lines, Japanese Patent Laid-Open No. 2-69096 discloses interlock control between an OA system and a control/supervisory system of building facilities.

Of late there has been demand for such an integrated building control system that the above-described integration and distribution types are combined with each other based on the concept of "integration of management/distribution of monitor control". The integrated building control system is one in which systems for building management, security, etc. are integrated, as subsystems, into a central processing unit or the like of a distributed building control system.

The above various forms of integrated systems in the prior art require a unified information transfer technique, i.e., an information communicating technique, not depending on the system forms.

The above-cited Japanese Patent Laid-Open No. 64-32597 and No. 1-135290 illustrate examples in which a contact signal, i.e., an on/off signal, is used as external inputs and external outputs of the centralized control system. Even in the case of sending simple information, therefore, it is imperative to provide a plurality of external input/output terminals and give the respective terminals specific meanings, resulting in limits of system extension. Furthermore, the prior art centralized control system of that type was able to transfer simple information, i.e., on/off information of contacts, among the limited systems, but not able to adapt for transfer of complex information among various systems in intelligent buildings or the like.

The information transfer processing of the above-cited Japanese Patent Laid-Open No. 64-30397 is intended to further reduce the burden on the central processing unit. But, because of incapability of interlocking the subsystems through information transfer among the subsystems integrated into the central processing unit, this prior art information transfer processing could not be applied to an integrated system.

In addition, since interlock data is previously sent to each of terminal units to be interlocked through the information transfer for interlocking the terminal units without intervention of the central processing unit, the interlock data necessary for each interlock must be stored in both the interlocking unit and the interlocked unit. Accordingly, interlocking a number of terminal units needs very large storage capacity for each unit and increases a load to be processed for the interlocking. This leads to a difficulty in processing of the monitor/control unit which requires real-time processing in its nature.

The above-cited Japanese Patent Laid-Open No. 2-69096 describes an interlock system in which various systems equipped in a building are connected to various OA systems equipped in offices through communication lines, and information for controlling facilities and equipment in the building are transferred from one system to another so that automatic coordinated operation may be performed between the systems without needing the attention of users. However, this prior art does not disclose a decision means for sending transfer information received from one subsystem to another system.

An object of the present invention is to provide a universal information transfer system which is not restricted by specifications of subsystems making up a target system, and also which does not restrict the specifications of those subsystems as far as possible.

SUMMARY OF THE INVENTION

To achieve the above and other objects, the present invention proposes an information transfer system comprising at least three subsystems communicating with each other using transfer information which contains an information unit common to all information handled by the subsystems, and information transfer control means for transferring at least the common information unit in the transfer information, received from each of the subsystems, to another subsystem.

To achieve the above and other objects, the present invention also proposes an information transfer system comprising at least three subsystems communicating with each other using transfer information which contains an information unit common to all information handled by the subsystems, and information transfer control means including information transfer control means and reference information storage means, and transferring at least the common information unit in the transfer information, received from the transferer subsystem, to the transferee subsystem determined based on reference information stored in the reference information storage means.

To achieve the above and other objects, the present invention further proposes an information transfer system comprising at least three subsystems having a vertical hierarchical relationship with at least one hierarchy, and communicating with each other using transfer information which contains an information unit common to all information handled by the subsystems; and information transfer control means including information transfer control means and reference information storage means, and transferring at least the common information unit in the transfer information, received from the transferer subsystem, to the transferee subsystem determined based on reference information stored in the reference information storage means.

The reference information storage means stores at least unique information such as codes, symbols, marks, abbreviations, numbers or the like standing for respective subsystems, the relationship between transferer subsystems and transferee subsystems, arrangements of information sent from the transferer subsystems, and arrangements of information sent to the transferee subsystems.

The transfer information contains, for example, at least information in the format of 5W1H as an information unit common to all transfer information handled by the subsystems.

Interface means of each transferer subsystem or transferee subsystem transmits and receives the transfer information to and from interface means of the other subsystem. The transferer subsystem has no need of taking into account the transferee subsystem, but it also can send the transfer information which contains the information taking into account the transferee subsystem.

Upon receiving the transfer information from the transferer subsystem or the interface means thereof, the information transfer control means determines the transferee subsystem based on the reference information stored in the reference information storage means. The information transfer control means also rearranges the transfer information to information in the format of 5W1H required for the determined transferee subsystem. Then, the information transfer control means transfers the rearranged transfer information to that transferee subsystem or the interface means thereof.

While the following embodiments will be described as transmitting and receiving information between transferer subsystems and transferee subsystems, it is alternatively possible that interface means are provided on the respective subsystems to transmit and receive information through those interface means. This enables reducing the burden of each subsystem during the information transfer, and makes the subsystems more universal.

Transfer condition setting means performs setting, addition, correction, deletion, etc. of the reference information in the reference information storage means. The transfer condition setting means can adopt any of various processing techniques such as one setting the reference information in a manual, one automatically setting the reference information with knowledge processing, and one adding transfer conditions to each subsystem and taking out the transfer conditions upon registration of the subsystem to thereby set the reference information. It is only needed that the reference information is set without any contradiction until the information transfer control means refers to the reference information in the reference information storage means after starting its operation. This is a technique for implementing the present invention by including the subsystem information in the transfer information.

On the other hand, rather than including the subsystem information in the transfer information, the information transfer control means can also determine the transferee based on only a pattern contained in the transfer information and indicating the presence or absence of items of the information unit in the format of 5W1H (When, Where, Who, What, Why, How), by storing the reference information, stated below, in the reference information storage means. Thus, in place of the reference information representing "the relationship between transferer subsystems and transferee subsystems" which is stored in the reference information storage means with the foregoing technique, the reference information representing "the relationship between a pattern (information unit arrangement) contained in the transfer information sent from the transferer subsystem and indicating the presence or absence of items of the information unit 5W1H, and an information unit arrangement of 5W1H required for the transferee subsystem" is stored in this case. For instance, when the information unit arrangement of the transfer information from the transferer subsystem X and indicating the presence or absence of items of "When, Where, Who, What, Why, How" has a pattern "1,1,1,0,0,1", the information transfer control means determines the subsystem A ("1,1,1,0,0,1") and the subsystem C ("1,1,0,0, 0,1,") as transferee subsystems to which the transfer information is to be transferred. Thus, only those subsystems for which the information unit arrangement indicating the presence or absence of 5W1H items and required thereby has no "1" set at locations of "0" in the information unit arrangement indicating the presence or absence of 5W1H items and received by the information transfer control means, are determined as transferee subsystems.

Furthermore, the present invention can easily realize rearranging the information of 5W1H format contained in the transfer information to, for example, the pattern "1,1,1,0,0,1" for the transfer information sent to the subsystem A and the pattern "1,1,0,0,0,1" for the transfer information sent to the subsystem C. Accordingly, the information transfer can be performed with information patterns less depending on subsystems.

With the present invention, not only when the transferer subsystems and transferee subsystems are in the ratio of 1:1 or 1:N, but also when information patterns are not in match with each other, the information transfer control means can take in information of plural subsystems, and adjust, rearrange, process or logically operate the take-in information to create the information which is meaningful or required for other one or more subsystems, followed by transferring it. Consequently, it is also possible to perform the information transfer with the transferer subsystems and transferee subsystems in the ratio of N:1 or N:M.

In this respect, the essence of the present invention resides in not a procedure description technique of "describing a software", but a data reference technique of "referring to information".

BRIEF DESCRIPTION OF THE DRAWINGS

FIG. 3 is a diagram showing the relationship between subsystems present in the system including various hierarchies and unique symbol information used in an reference information storage means 3;

FIG. 4 is a diagram showing the corresponding relationship between transferer subsystems and transferee subsystems;

FIG. 5 is a diagram showing an arrangement of the information unit 5W1H sent from the transferer subsystem;

FIG. 6 is a diagram showing an arrangement of the information unit 5W1H sent to the transferee subsystem;

FIG. 9 is a diagram showing the stored contents of a subsystem information storage means which stores symbol information using unique for every two alphabetic capitals to indicate respective subsystems present in the system;

FIG. 10 is a diagram showing the stored contents of a transfer information storage means which stores information representative of the corresponding relationship between transferer subsystems and transferee subsystems of transfer information;

FIG. 11 is a diagram showing the stored contents of an information arrangement storage means which stores information representative of the arrangement of each information unit 5W1H sent from the transferer subsystem;

FIG. 12 is a diagram showing the stored contents of the information arrangement storage means which stores information representative of the arrangement of each information unit 5W1H sent to the transferee subsystem;

FIG. 17 is a diagram showing an example of the configuration of a second information storage table 77 of FIG. 13;

FIG. 24 is a diagram showing an example of reference information used in the information transfer control means 11 of FIG. 20;

FIG. 27 is a diagram showing an example of transfer enable information used in the embodiment of FIG. 26;

FIG. 29 is a representation showing an example of screen display of the transfer condition setting means;

FIG. 30 is a representation showing an example of screen display of the transfer condition setting means;

FIG. 31 is a representation showing an example of screen display of the transfer condition setting means;

FIG. 32 is a representation showing an example of screen display of the transfer condition setting means in which execute information and enable information are displayed separately;

FIG. 34 is a representation showing an example of screen display of the transfer condition setting means in which execute information and enable information are displayed separately;

FIG. 35 is a representation showing an example of screen display of the transfer condition setting means for sequentially displaying items required to be set and correcting the reference information in accordance with the display;

FIG. 36 is a representation showing an example of screen display of the transfer condition setting means for sequentially displaying items required to be set and correcting the reference information in accordance with the display;

FIG. 37 is a representation showing an example of screen display of the transfer condition setting means for sequentially displaying items required to be set and correcting the reference information in accordance with the display;

FIG. 38 is a block diagram showing the functional configuration of an embodiment in which the information transfer system of the present invention is applied to a steel production system;

FIG. 43 is a diagram showing an example of information arrangement patterns storing the corresponding relationship between pattern codes and information arrangements of 5W1H;

FIG. 44 is a diagram showing an example of transfer patterns storing the relationship in information transfer between pattern codes; and FIG. 45 is a diagram showing an example of subsystem patterns storing the relationship between pattern codes and subsystems.

DESCRIPTION OF THE PREFERRED EMBODIMENTS

Hereinafter, preferred embodiments of the present invention will be described with reference to the drawings. Prior to entering description of practical embodiments, the terms "system (Sisutemu in Japanese)" and "subsystem" are defined below. "Sisutemu" is defined as "organization, institution, system or scheme" by ordinary Japanese dictionaries. As a control technician or a system engineer considering the term "system" from the standpoint of engineering, Shinji Niinaka defines it in "Measurement and Control" (Vol. 29, No. 7, p. 82) as "a thing in which a number of elements are organically combined with each other to act and operate toward the same object while keeping harmony". In this specification, those elements organically combined with each other are called subsystems. In some cases, a higher-level element created by combining a plurality of lower-level elements is also called a subsystem. Generally, in other words, a system comprises a plurality of elements, and each of these element comprises a plurality of lower-level elements. All these elements are subsystems. When one subsystem manages and supervises another subsystem, the former is called a central unit and the latter is called simply a subsystem or terminal unit.

Figure 1:
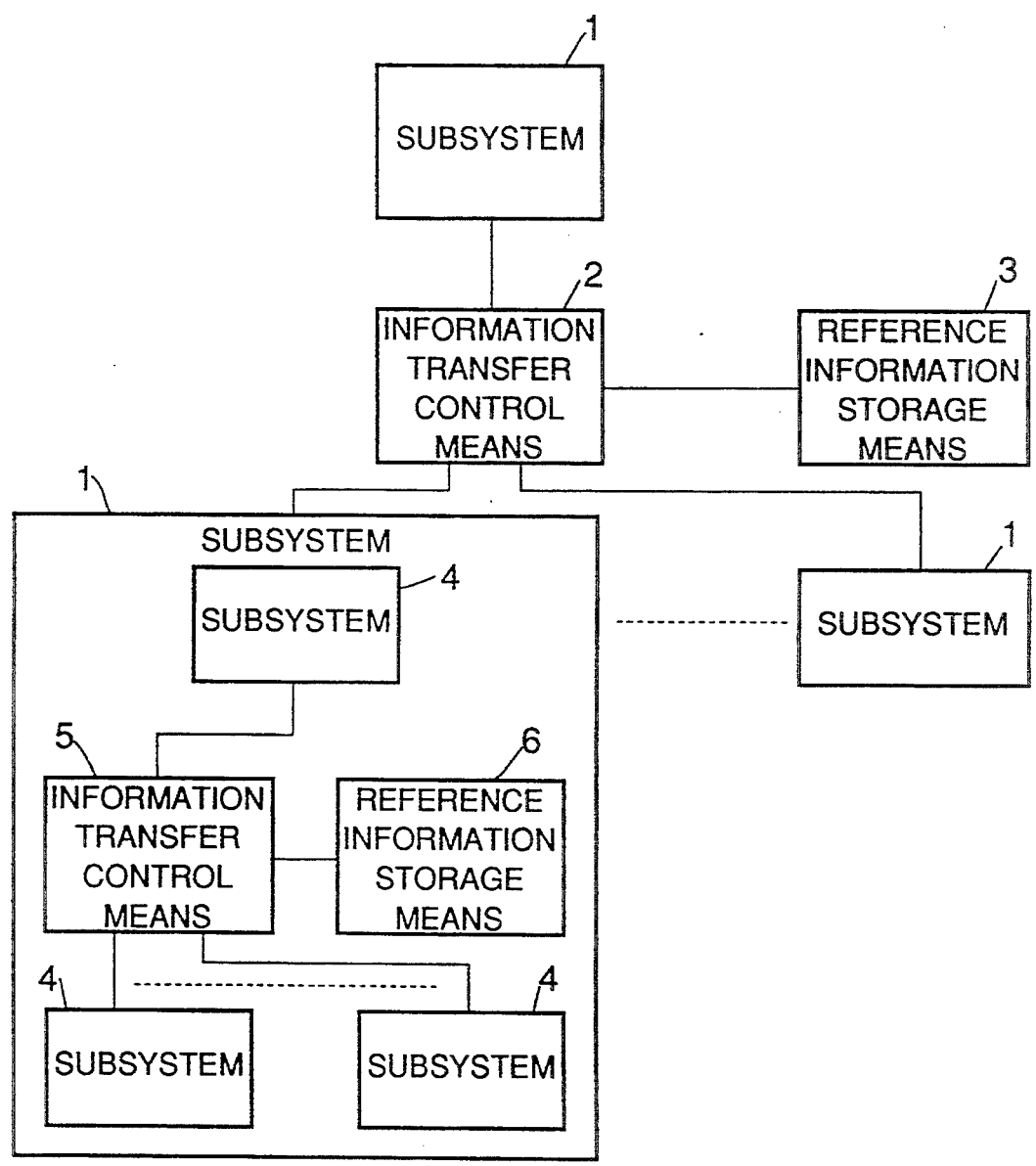
FIG. 1 is a block diagram showing the configuration of an embodiment in which an information transfer system according to the present invention is applied to a hierarchical system.

FIG. 1 is a block diagram showing the configuration of an embodiment in which an information transfer system according to the present invention is applied to a hierarchical system. This hierarchical system comprises subsystems 1, information transfer control means 2 and reference information means 3, each in plural number. Each subsystem 1 also has the hierarchical system configuration, i.e., it similarly comprises subsystems 4, information transfer control means 5 and reference information means 6. The subsystem at a level lower than the subsystem 4 can also be configured in a like manner, as required.

Information transfer control carried out in the hierarchical system shown in FIG. 1 will now be explained. When information to be transferred is present, each subsystem 1 transfers the transfer information of predetermined format to the information transfer control means 2. Based on reference information of the reference information storage means 3, the information transfer control means 2 determines the subsystem to which the received transfer information is to be transferred, and then transfers the transfer information to the transferee subsystem determined. The transferee subsystem may be a plurality of subsystems.

The transfer information of predetermined format is at least an information unit common to the contents of transfer information to be handled by all subsystems, e.g., information arranged to include at least an information unit of 5W1H.

Figure 2:
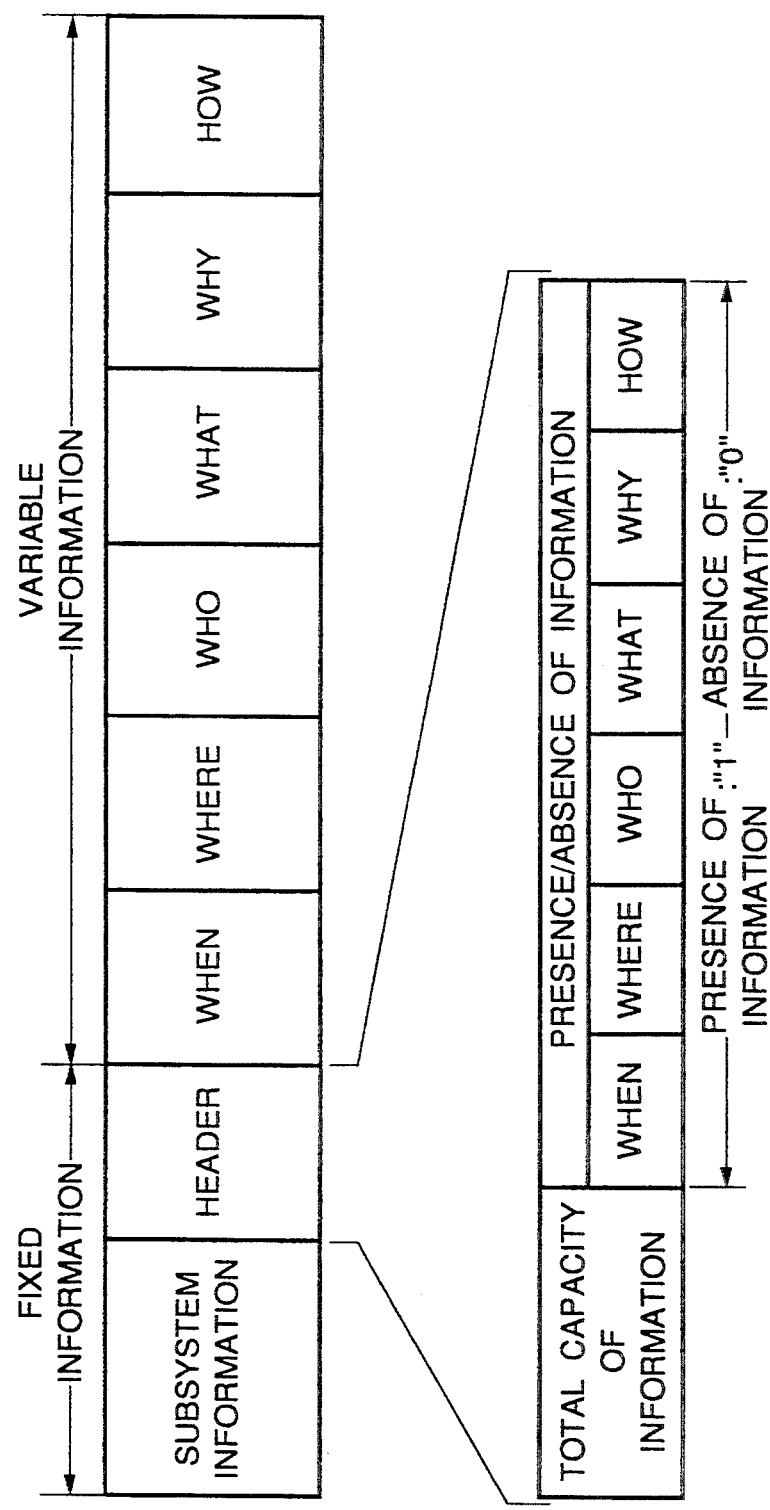
FIG. 2 is a diagram showing an example of the format of transfer information containing an information unit of 5W1H as at least an information unit common to the contents of transfer information to be handled by all subsystems.

FIG. 2 is a diagram showing an example of the format of the transfer information containing an information unit of 5W1H as at least an information unit common to the contents of transfer information to be handled by all subsystems. The transfer information of FIG. 2 comprises fixed information and variable information. The fixed information consists of subsystem information and a header. The subsystem information is unique information representing each subsystem, such as a symbol, code, number, mark, abbreviation or the like. The header includes at least such information as representing total capacity of the transfer information and the presence or absence of the information unit 5W1H. The variable information is given by concrete information of 5W1H when the header information is present, i.e., "1".

The reference information storage means 3 is made up by a set of information shown in FIGS. 3, 4, 5 and 6, for example. FIG. 3 is a diagram showing the relationship between subsystems present in the system including various hierarchies and unique symbol information used in the reference information storage means 3. FIG. 4 is a diagram showing the corresponding relationship between transferer subsystems and transferee subsystems. In FIG. 4, "0" indicates that information is not transferred, and "1" indicates that information is transferred. FIG. 5 is a diagram showing an example of arrangement of the information unit 5W1H sent from the transferer subsystem. FIG. 6 is a diagram showing an example of arrangement of the information unit 5W1H sent to the transferee subsystem. In FIGS. 5 and 6, "1" indicates the presence of information and "0" indicates the absence of information.

Figure 7:
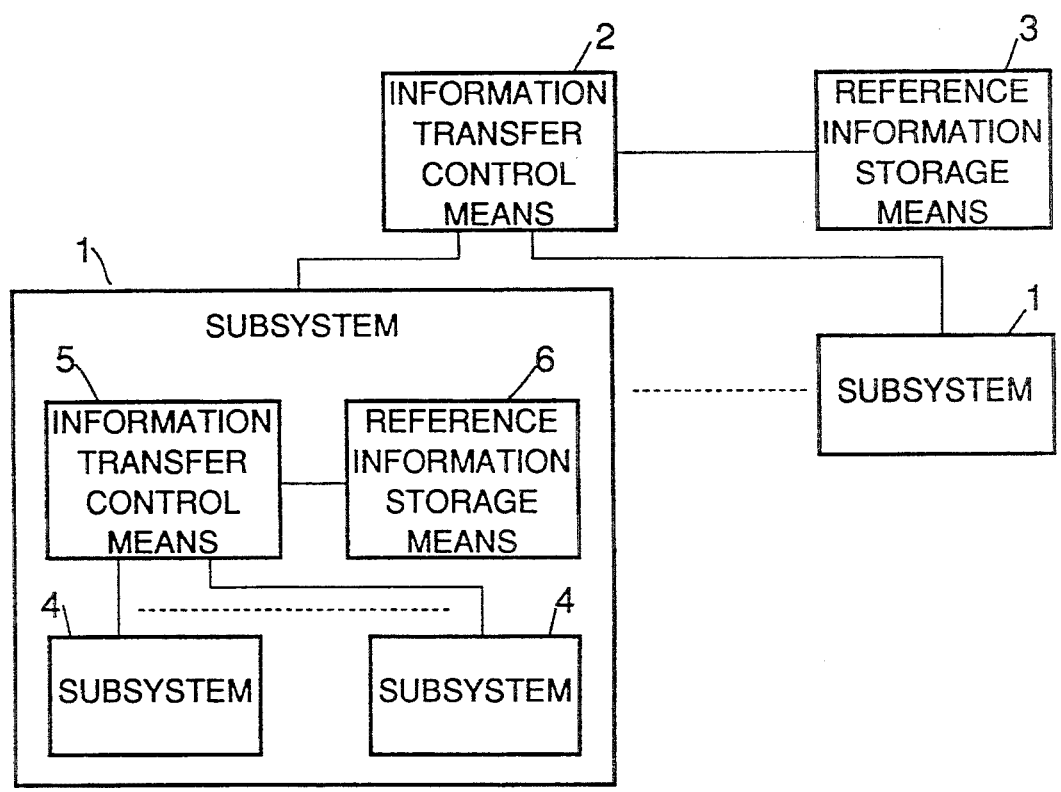
FIG. 7 is a block diagram showing the configuration of an embodiment in which the information transfer system according to the present invention is applied to a horizontal system.

FIG. 7 is a block diagram showing the configuration of an embodiment in which the information transfer system of the present invention is applied to a horizontal system. The horizontal system shown in FIG. 7 has no central unit and comprises a plurality of subsystems standing on the same level.

This horizontal system operates in a like manner to the embodiment shown in FIG. 1. When information to be transferred to another subsystem is present, each subsystem 1 transfers the transfer information of predetermined format to an information transfer control means 2. Based on reference information of a reference information storage means 3, the information transfer control means 2 determines the subsystem to which the received transfer information is to be transferred, and then transfers the transfer information to the transferee subsystem determined. The transferee subsystem may be a plurality of subsystems.

Figure 8:
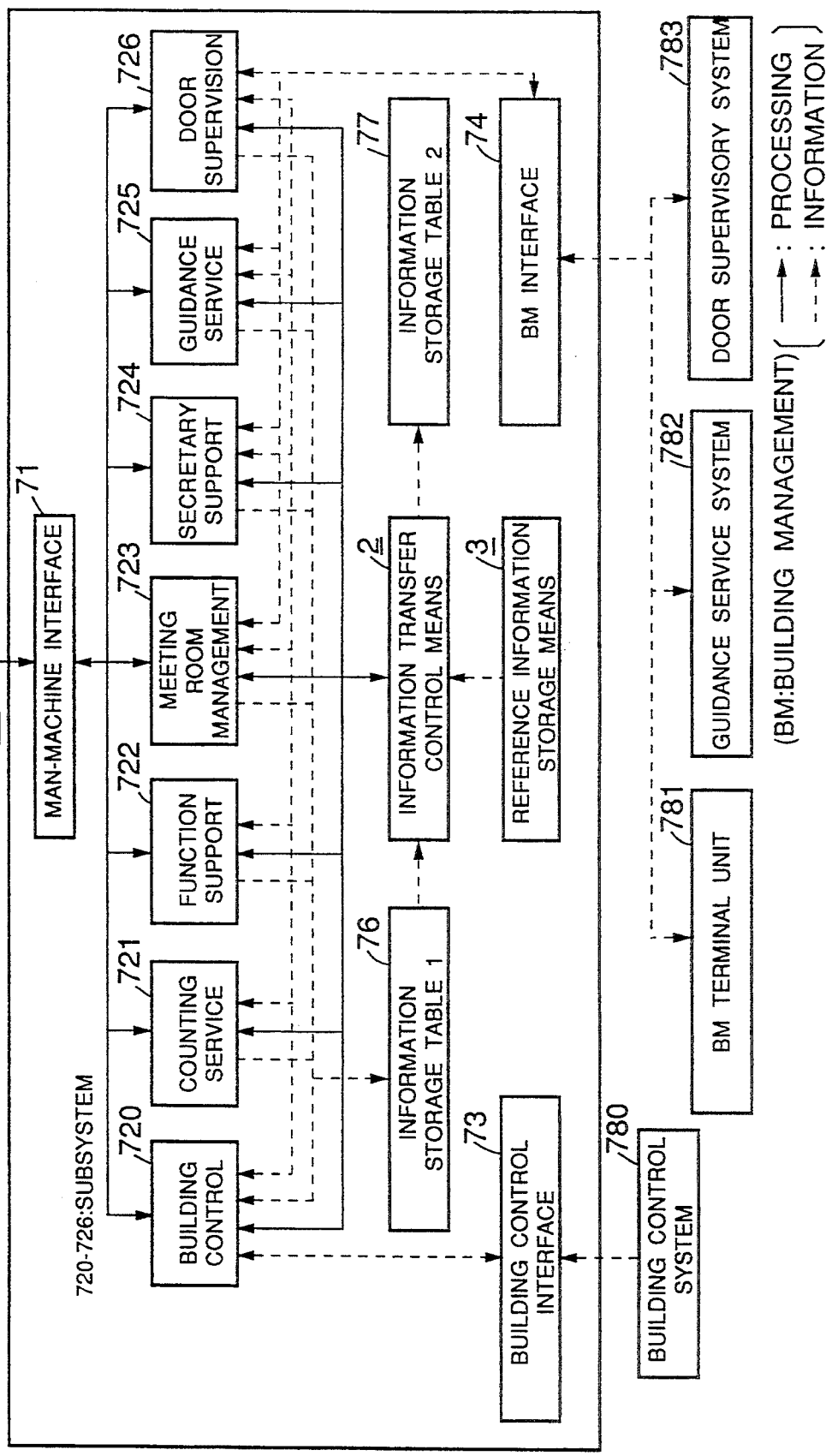
FIG. 8 is a block diagram showing the configuration of an embodiment in which the information transfer system according to the present invention is applied to an integrated system with various systems connected, as subsystems, to a central unit.

FIG. 8 is a block diagram showing the configuration of an embodiment in which the information transfer system of the present invention is applied to an integrated system with various systems connected, as subsystems, to a central unit. One example of such an integrated system is a building management integrated building control (supervisory) system. The building management system is one carrying out operation management, services and the like for building automation. It includes, for example, subsystems of meeting room management, reception support, secretary support, equipment management, equipment operation management, counting service, guidance service, etc. Furthermore, a security system such as door supervision, for example, may also be integrated, as an additional subsystem, into the building management system.

The integrated system of FIG. 8 comprises an information transfer control means 2, a reference information storage means 3, a central unit 7, a display unit 8 such as a CRT or liquid crystal display, and an input unit 9 such as key boards or a mouse. The central unit 7 includes a man-machine interface 71, subsystems of building control monitor 720, counting service 721, function support 722, meeting room management 723, secretary support 724, guidance service 725, door supervision 726, etc., a building control interface 73, a building management (BM) interface 74, a first information storage table 76, a second information storage table 77, a building control system 780, a building management terminal unit 781, a guidance service system 782, and a door supervisory system 783.

Operations of the subsystems in FIG. 8 will now be described one by one. The building control monitor (subsystem) 720 receives through the man-machine interface 71 an instruction or the like entered by an operator from the input unit 9, and transmits the instruction to the building control system 780 through the building control interface 73. On demand from the operator, the building control monitor 720 also displays the requested information on the display unit 8 through the man-machine interface 71.

The counting service 721 calculates charges of building facilities/equipment, power, shared equipment, etc. depending on their usage conditions, and prepare details accounts for tenants. The function support 722 manages usage conditions of the building facilities/equipment, and operation of the building equipment such as maintenance and replacement of equipment and parts. The meeting room management 723 manages usage schedules of meeting rooms and shared facilities in the building. The secretary support 724 manages schedules of directors, executives and so forth of tenant companies. The guidance service 725 gives visitors to the building, tenants, etc. information in a timely manner about the building and tenants such as entertainments or events taking place in the building, construction/repairing schedules, and other topics. The door supervision 726 controls and supervises electric locks installed in entrance/exit doors of the building and room doors therein.

When transferring information among those subsystems, the reference information storage means 3 stores a set of information shown in FIGS. 9, 10, 11 and 12, for example.

FIG. 9 is a diagram showing the stored contents of a subsystem information storage means which stores symbol information using unique two alphabetic capitals to indicate respective subsystems present in the system. FIG. 10 is a diagram showing the stored contents of a transfer information storage means which stores information representative of the corresponding relationship between transferer subsystems and transferee subsystems of transfer information. In FIG. 10, "0" indicates that information is not transferred, and "1" indicates that information is transferred. FIG. 11 is a diagram showing the stored contents of an information arrangement storage means which stores information representative of the arrangement of each information unit 5W1H sent from the transferer subsystem. The upper half of FIG. 11 indicates one example of actual information for each information unit, whereas the lower half indicates the presence of information at each storage location in the upper half as "1" and the absence of information thereat as "0". FIG. 12 is a diagram showing the stored contents of the information arrangement storage means which stores information representative of the arrangement of each information unit 5W1H sent to the transferee subsystem. The upper half of FIG. 12 indicates one example of actual information for each information unit, whereas the lower half indicates the presence of information at each storage location in the upper half as "1" and the absence of information thereat "0".

When some subsystem has "0" at all storage locations of the information arrangement storage means in FIG. 11, i.e., no information, that subsystem has no need of transferring the transfer information to the information transfer control means 2 and thus does not become a transferer subsystem. When some subsystem has "0" at all storage locations of the information arrangement storage means in FIG. 12, i.e., no information, that subsystem does not receive any transfer information from the information transfer control means 2 and thus does not become a transferee subsystem.

The transfer information is arranged below, by way of example, using the format of FIG. 2. The symbol information shown in FIG. 9 about the transferer subsystem is set as the subsystem information in the fixed information. The respective information units shown in the lower half of FIG. 11 are set as the presence or absence of information in the header. Concrete information of the respective information units in the upper half of FIG. 11 is set as the variable information. Thus, concrete information of those information units in which "1" is set as to the presence or absence of information is added as variable information.

When the information set in the meeting room management 723 is transferred to both the building control monitor 720 and the door supervision 726 in the integrated system of FIG. 8, the operator activates the meeting room management 723 and inputs certain information requested. The certain information requested comprises at least usage date of a meeting room, time zone of the use, used room, user name (code name), etc. The information thus inputted is stored in a file or the like for managing reservations. The inputted information is given by information representative of "when", "where", "who" and "how" (used/canceled). As a basis of the information, there are adopted 5W1H (When, Where, Who, What, Why, How) items. Transfer information containing a part or the whole of this information unit 5W1H is then transferred to both the building control monitor 720 and the door supervision 726.

More specifically, the transferer subsystem transfers the information arranged in the format of FIG. 2 to the information transfer control means 2 through the first information storage table 76. The information transfer control means 2 transfers that information to the transferee subsystem through the second information storage table 2. The transfer information held in the first information storage table 76 and/or the second information storage table 77 is written into and read out of them in an FIFO (First In First Out) manner.

Upon receiving the transfer information from the meeting room management 723 through the first information storage table 76, the information transfer control means 2 refers to the stored contents of the reference information storage means 3 of FIG. 10 and searches the building control monitor 720 and the door supervision 726 as transferee subsystems. The information transfer control means 2 rearranges the information unit 5W1H (FIG. 11) of the received transfer information to the information unit (FIG. 12) for each transferee subsystem. The information transfer control means 2 transmits the rearranged information to the transferee subsystems, i.e., the building control monitor 720 and the door supervision 726, through the second information storage table 77. Based on the transfer information received by the building control monitor 720, the building control system 780 can control an air conditioner, etc. of the meeting room. The door supervision 726 confirms the people coming into or outgoing from the meeting room and then similarly transfers information using a confirmation signal as a trigger, enabling it to turn on/off illuminations through the building control system 780. This allows users to attend the conference under comfortable environments. On the other hand, the building supervisor can confirm the participants for the increased effect of preventing crimes.

Figure 13:
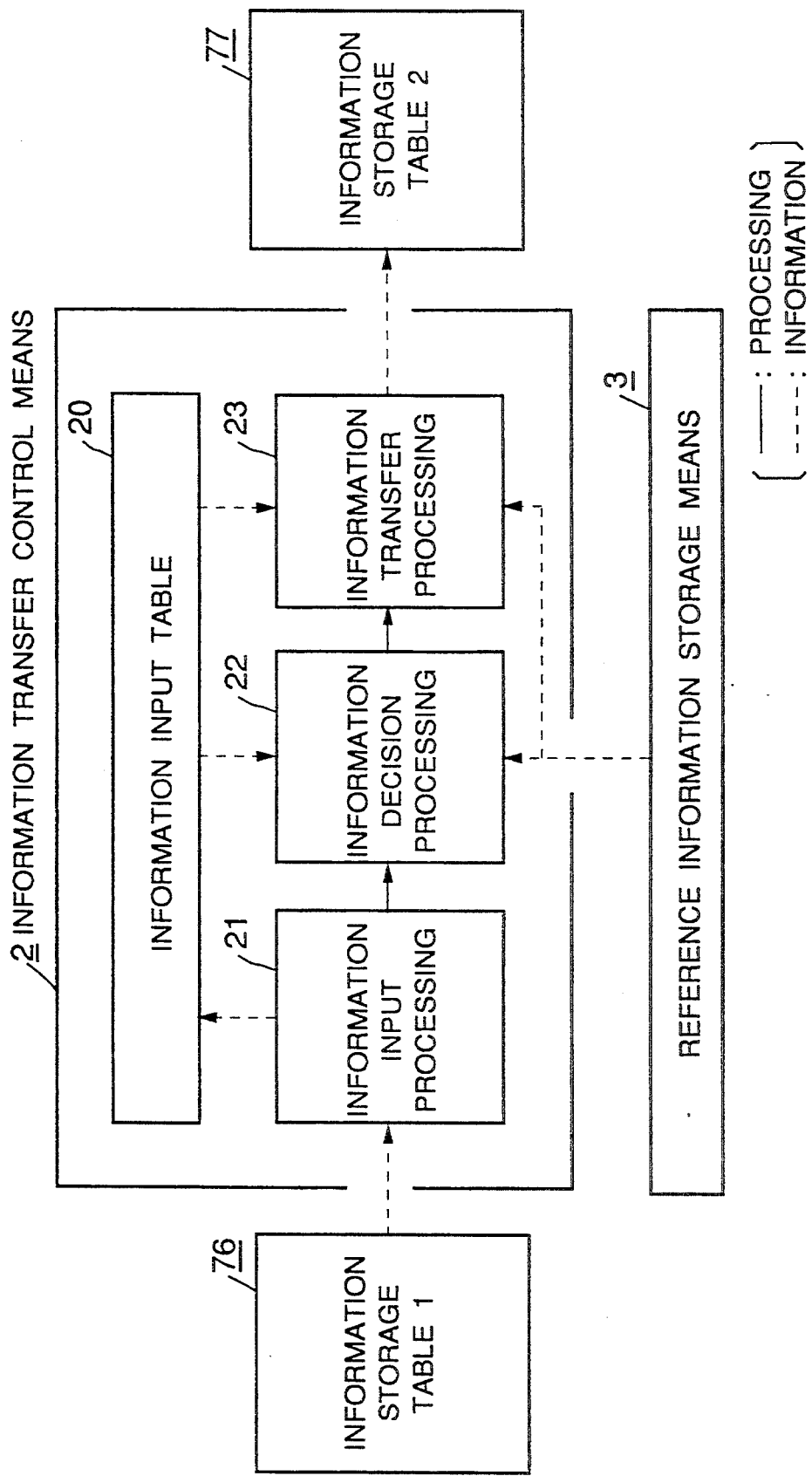
FIG. 13 is a block diagram showing an example of the configuration of an information transfer control means 2 shown in FIG. 1.

FIG. 13 is a block diagram showing an example of the configuration of the information transfer control means 2. The information transfer control means 2 includes at least an information input table 20, a step of information input processing 21 to take the transfer information from the first information storage table 76 into the information input table 20 in an FIFO manner, a step of information decision processing 22 to check the arrangement of the transfer information taken into the information input table 20, and a step of information transfer processing 23 to rearrange the transfer information taken into the information input table 20 for transferring it to the transferee subsystem through the second information storage table 77.

Figure 14:
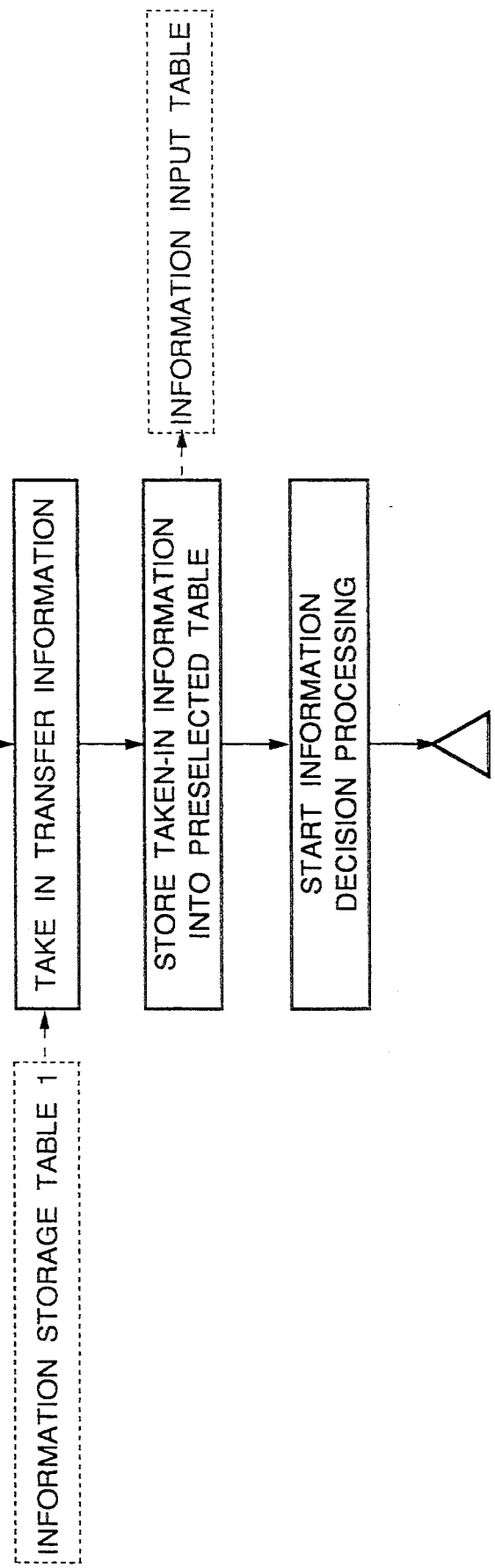
FIG. 14 is flowchart showing the process sequence of a information input processing 21.

FIG. 14 is a flowchart showing the process sequence of the information input processing 21.

Take in transfer information: the transfer information having the format shown in FIG. 2 and stored in the first information storage table 76 is taken-in in an FIFO manner.

Store into preselected table: the taken-in information is stored into the information input table 20.

Start information decision processing: the information decision processing 22 is started.

Figure 15:
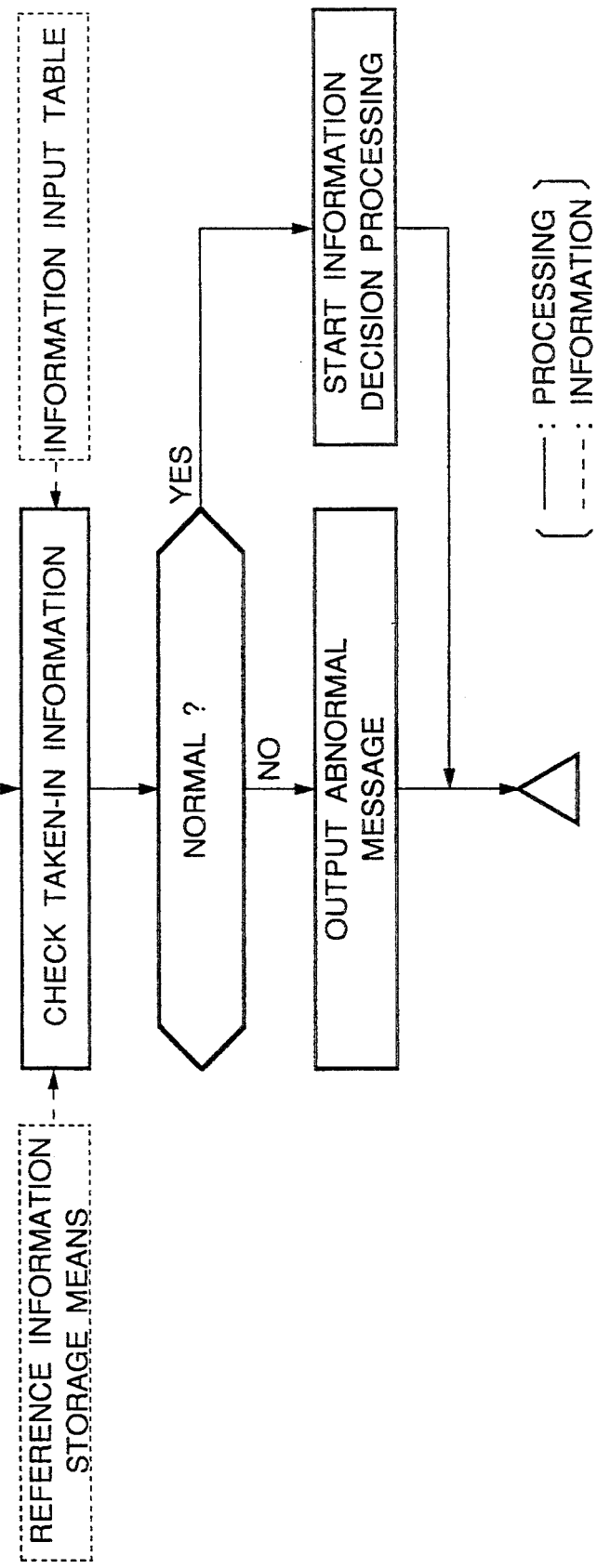
FIG. 15 is a flowchart showing the process sequence of information decision process 22 of FIG. 13.

FIG. 15 is a flowchart showing the process sequence of the information decision processing 22:

Check taken-in information: the information stored into the information input table 20 is checked as to whether it is normal or not, using the information stored in the reference information storage means 3.

Normal ?: As a result of the check, the process flow shifts to start of the information transfer processing if normal, and shifts to output of an abnormal message if not normal.

Start information transfer processing: the information transfer processing 23 is started.

Output abnormal message: a message is outputted and displayed depending on the abnormal state.

Figure 16:
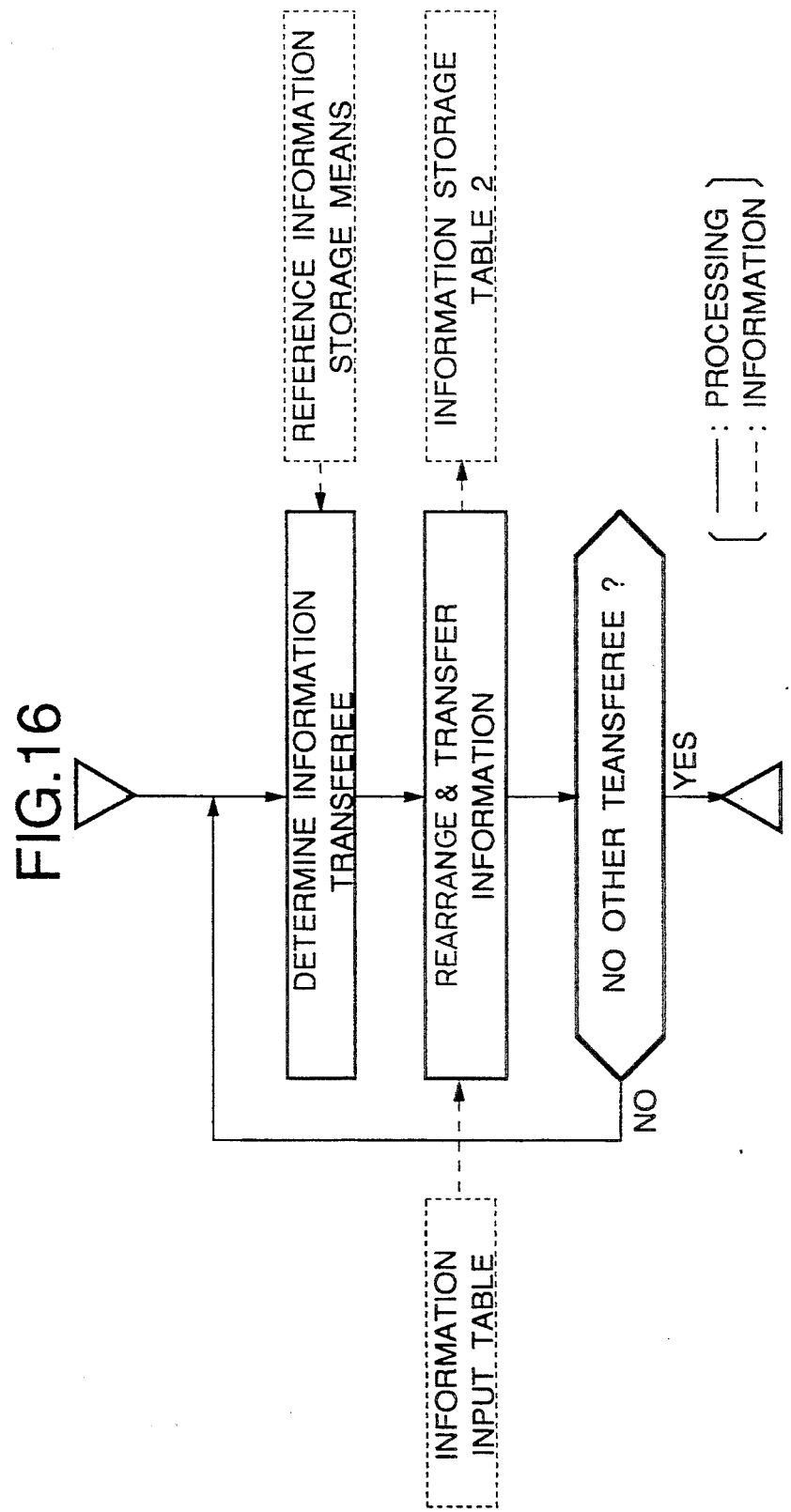
FIG. 16 is a flowchart showing the process sequence of information transfer processing 23 of FIG. 13.

FIG. 16 is a flowchart showing the process sequence of the information transfer processing 23.

Determine information transferee: the transferee subsystem is determined using the stored contents of the reference information storage means 3 shown in FIGS. 9 to 12.

Rearrange and transfer information: the transfer information in the information input table 20 is rearranged to the information arrangement for the transferee subsystem using the stored contents of the reference information storage means 3 shown in FIGS. 9 to 12, followed by storing it at a corresponding location of the second information storage table 77 shown in FIG. 17 in an FIFO manner.

No other transferees ?: if there are no other transferees, the process is ended. If there is any other transferee, the process is continued by returning to the first step of determining the information transferee.

With the above operation of the information transfer control means 2, it is possible to realize information transfer between integrated subsystems, and interlock those subsystems. This interlocking of the subsystems reduces a quantity of operations, improves convenience of the users, and make the information transfer more universal. Furthermore, the transferer subsystem has no need of taking into account the transferer subsystem, and the transferee subsystem can be easily changed by modifying the setting of the reference information storage means 3.

Figure 18:
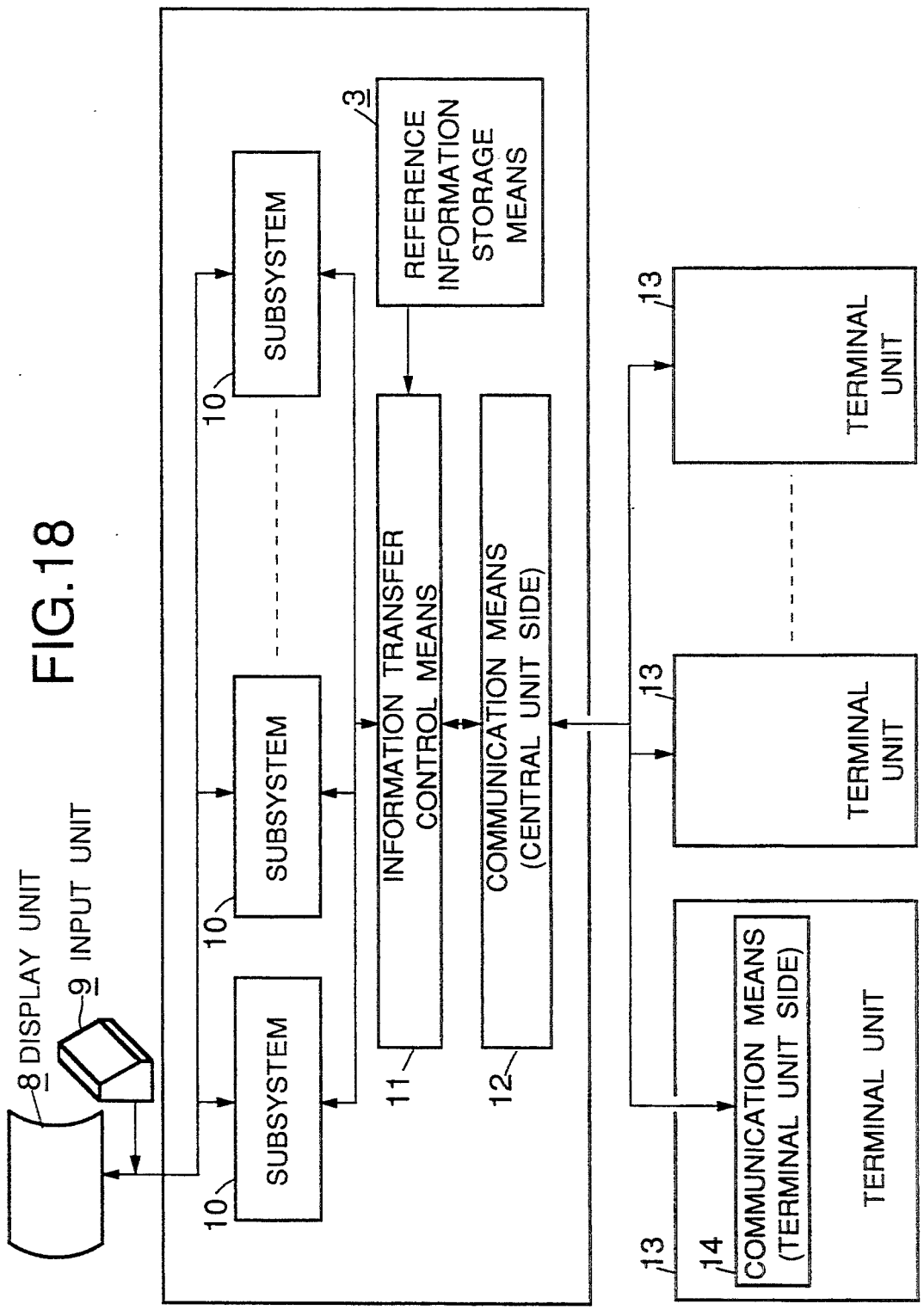
FIG. 18 is a block diagram showing the configuration of an embodiment of a building management integrated system with an attention directed to, in particular, functions of terminal units 13 of the integrated system.

FIG. 18 is a block diagram showing the configuration of an embodiment of a building management integrated system with attention directed to, in particular, functions of terminal units 13 of the integrated system. The integrated system of FIG. 18 includes a reference information storage means 3, a central unit 7, a display unit 8, an input unit 9, a plurality of subsystems 10, an information transfer control means 11, a communication means 12 on the central unit side, terminals 13, and communication means 14 on the terminal unit side.

One example of such a system is a building management integrated system or a building management integrated building control system in which respective systems for building management, security, etc. are integrated, as subsystems, by a central unit.

In this type integrated system having the central unit and at least one terminal unit, information such as mails, data and signals can be transferred between the central unit and the terminal unit, or between the terminal units, or/and between the central subsystem and the subsystem, without newly introducing communication equipment such as LAN or the like. This integrated system is aimed to transfer the transfer information to a target destination (transferee) and also to judge the information about need of transfer, which is contained in the transfer information, thereby for transferring information to other subsystems as well depending on the judged result based on the reference information stored in the reference information storage means. In this case, the information source (transferer) is not required to explicitly specify the transferee and thus only required to specify the need of transfer. In other words, the information transfer control means judges the information about the need of transfer and, depending on the judged result, determines the transferee based on the reference information stored in the reference information storage means. The reference information may be stored in the form of an IF-THEN-rule or knowledge in accordance with the fuzzy theory or the like. The information transfer control means may be provided at one location in the central unit, or distributedly provided in all or a part of the terminal units.

Operation of the integrated system of FIG. 18 will now be described in accordance with the foregoing concept.

The subsystems 10 integrated into the central unit 7 of the integrated system each carries out a predetermined operation based on inputs from the display unit 8 and the input unit 9. Examples of the subsystems 10 are ones of meeting room management, secretary support, reception support, counting service, etc. The central unit 7 is connected to the terminal units 13 through communication lines. The subsystems 10 of the central unit 7 can communicate with the terminal units 13 through the communication means 12, 14 respectively associated therewith.

Figure 19:
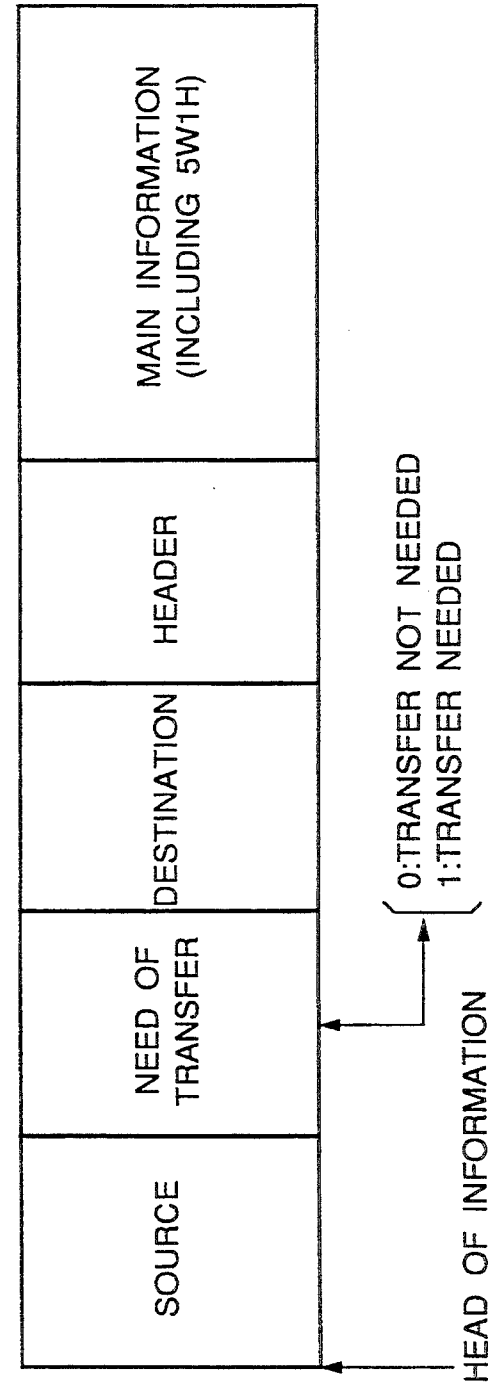
FIG. 19 is a diagram showing an example of the format of information containing the information unit 5W1H.

The transfer information arranged to the predetermined format and transferred from the terminal unit 13 is sent to the specified subsystem 10 through the communication means 14 of the terminal unit 13, the communication means 12 of the central unit 7 and the information transfer control means 11. One example of an arrangement of the predetermined format is shown in FIG. 19. Although communication is also permitted using the format of FIG. 2, the destination information cannot be specified in this case.

FIG. 19 is a diagram showing an example of the format of information containing the information unit 5W1H. The format of FIG. 19 comprises at least source (transferer) information, information about need of transfer, destination (transferee) information, fixed information as a header, and variable information as main information to be sent. Set as the source information is unique information such as a code, symbol, mark, abbreviation, number or the like. Set as the information about need of transfer is "0" when the transfer information is transferred to only the destination specified in the following column, and "1" when the transfer information is transferred to also the destinations other than specified. Set as the destination information is unique information such as a code, symbol, mark, abbreviation, number or the like. Set as the header is the presence or absence of every terms of the information unit 5W1H contained in the main information. Furthermore, the main information to be sent comprises, for example, type of information, capacity of the variable information, and concrete information of every terms of the information unit such as 5W1H (When, Where, Who, What, Why, How) which are indicated by the header as containing information, in the case of including the type of information such as mail, data or signal.

Figure 20:
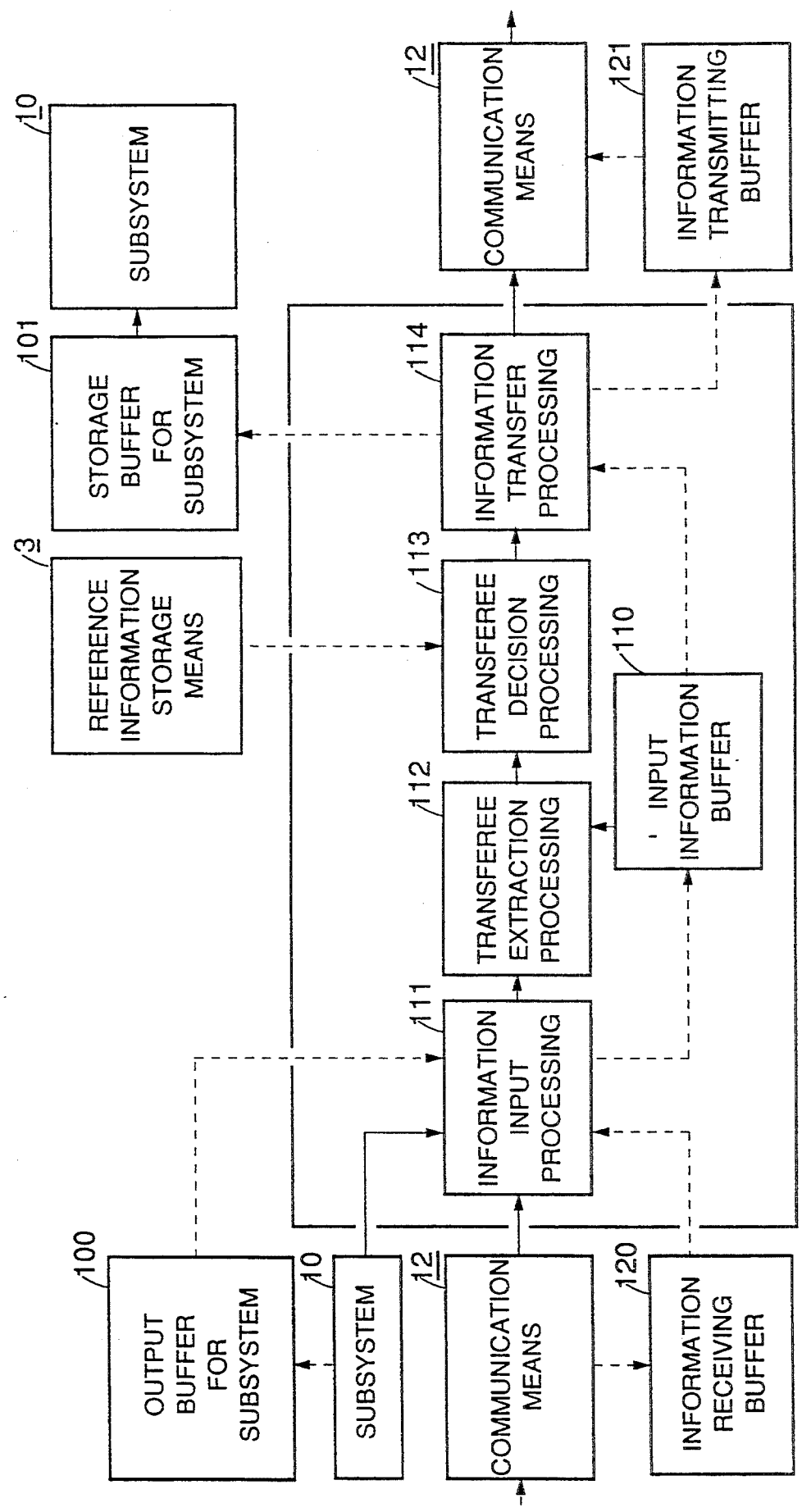
FIG. 20 is a block diagram showing an example of the configuration of an information transfer control means 11 of FIG. 18.

FIG. 20 is a block diagram showing an example of the configuration of the information transfer control means 11. The information transfer control means 11 includes a communication means 12, a storage buffer 100 for the subsystem 10, a step of information input processing 111 connected to an information receiving buffer 120, a step of transferee extraction processing 112, a step of transferee decision processing 113, a step of information transfer processing 114 connected to the communication means 12, the subsystem storage buffer 100 and an information transmitting buffer 121, and an input information buffer 110, and it is also connected to the reference information storage means 3.

The transfer information sent from the terminal unit 13 is taken into the information receiving buffer 120 through the communication means 12 in an FIFO manner. Upon the take-in of the information, the communication means 12 activates the information transfer control means 11. The activated information transfer control means 11 receives the transfer information taken into the information receiving buffer 120 in an FIFO manner, analyses the transfer information, and then transfers it to the transferee. The transfer information to be sent from the subsystem 10 is loaded into the subsystem output buffer 100 in an FIFO manner, while activating the information transfer control means 11. The activated information transfer control means 11 receives the transfer information taken into the subsystem output buffer 100 in an FIFO manner, analyses the transfer information, and then transfers it to the transferee.

Figure 21:
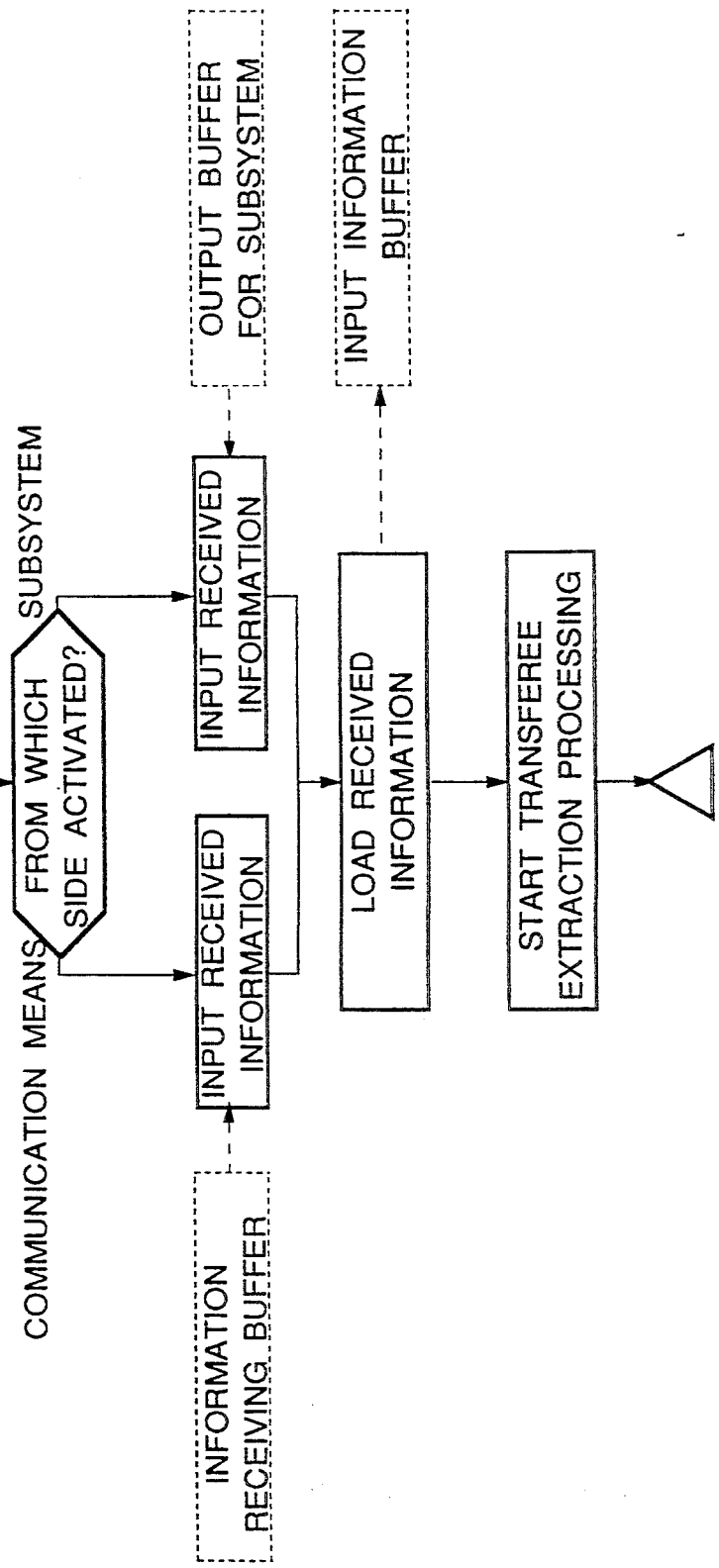
FIG. 21 is a flowchart showing the process sequence of information input processing 111 of FIG. 20.

FIG. 21 is a flowchart showing the process sequence of the information input processing 111.

From which side activated ?: it is judged from which side of the subsystem 10 or the communication means 12 the information transfer control means 11 has been activated.

Input received information: when activated by the subsystem 10, the transfer information is inputted from the subsystem output buffer 100 to the information transfer control means 11 in an FIFO manner; when activated by the communication means 12, the transfer information is inputted from the information receiving buffer 120 to the information transfer control means 11 in an FIFO manner.

Load received information: the inputted transfer information is loaded into the input information buffer 110.

Start transferee extraction processing: the transferee extraction processing 112 is started up.

Figure 22:
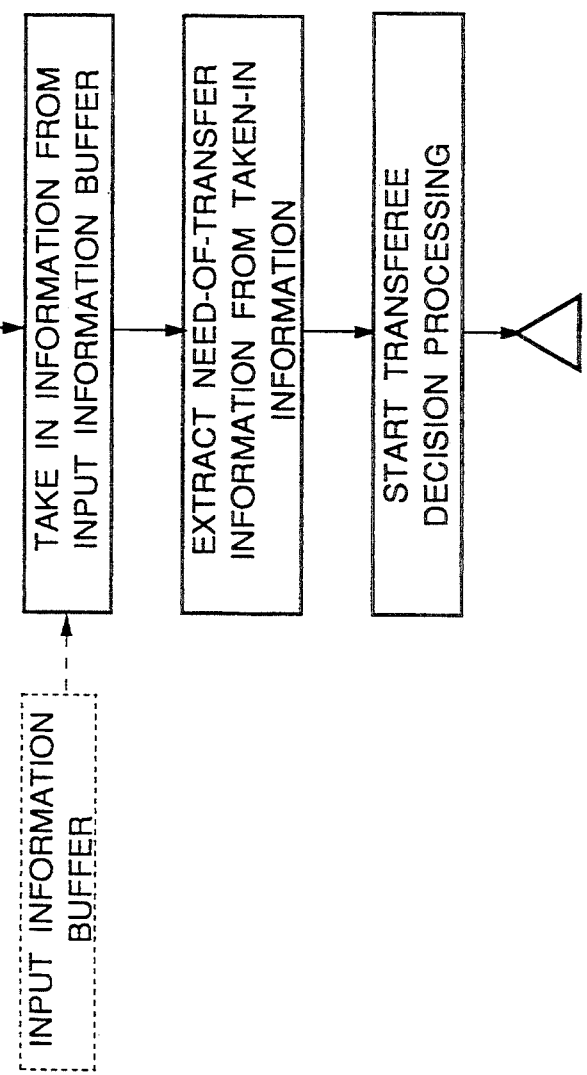
FIG. 22 is a flowchart showing the process sequence of transferee extraction processing 112 of FIG. 20.

FIG. 22 is a flowchart showing the process sequence of the transferee extraction processing 112.

Take in information from input information buffer: the transfer information is taken in from the input information buffer 110.

Extract need-of-transfer information from taken-in information: the information about the need of transfer contained in the taken-in information is extracted.

Start transferee decision processing: the transferee decision processing 113 is started up.

Figure 23:
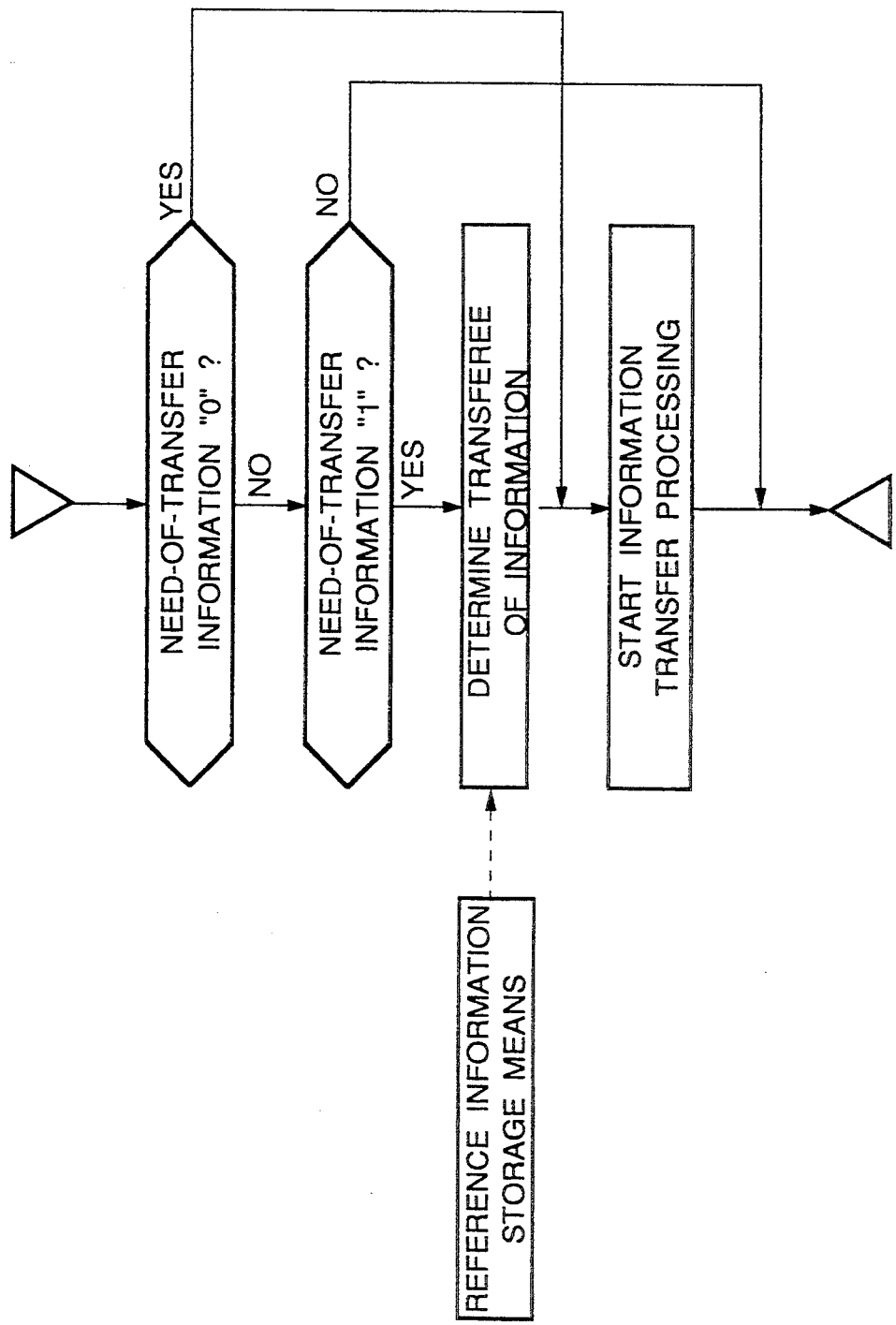
FIG. 23 is a flowchart showing the process sequence of transferee decision processing 113 of FIG. 20.

FIG. 23 is a flowchart showing the process sequence of the transferee decision processing 113.

Need-of-transfer information "0" ?: it is determined whether the information about the need of transfer extracted in the transferee extraction processing 112 is "0" or "1". In case of YES (0), the information transfer processing 114 is started up. In case of NO (other than 0), the following processing will be executed.

Need-of-transfer information "1" ?: in case of NO (other than 1), the processing is brought into and end because the need-of-transformation is abnormal. In case of YES (1), the following processing will be executed.

Determine transferee of information: the reference information storage means 3 previously stores the reference information shown in FIG. 24, for example, and based on the source information and/or the destination information contained in the transfer information which is loaded in the input information buffer 110, the transferee is determined corresponding to the location where "1" is set.

Start information transfer processing: the information transfer processing 114 is started up.

Figure 25:
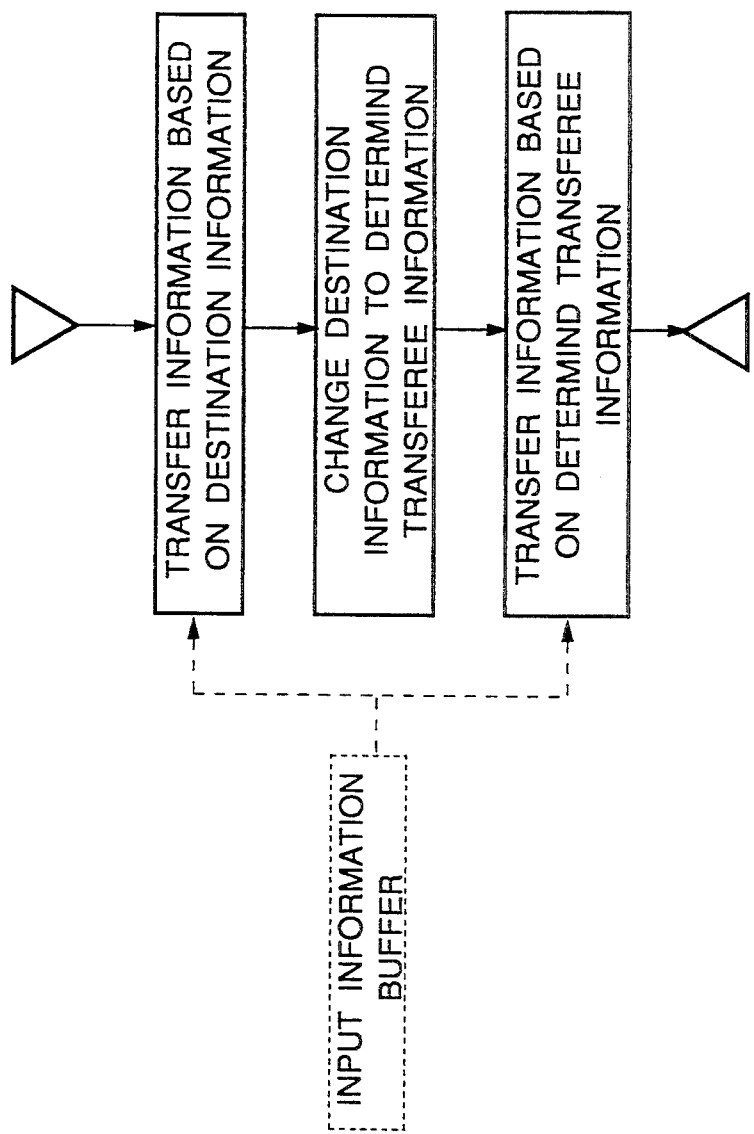
FIG. 25 is a flowchart showing the process sequence of information transfer processing 114 of FIG. 20.

FIG. 25 is a flowchart showing the process sequence of the information transfer processing 114.

Transfer information based on destination information: the transfer information loaded in the input information buffer 110 is transferred based on the destination information contained in the transfer information.

Change destination information to determined transferee information: the destination information contained in the transfer information, which is loaded in the input information buffer 110, changed to the transferee determined by the transferee decision processing 113. Further, the information about the need of transfer is changed to "0".

Transfer information based on determined transferee information: the transfer information with the destination information changed to the transferee information is transferred based on the transferee information.

With the above transfer technique, the transferer subsystem has no need of taking into account the transferee subsystem, and the transferee subsystem can be easily changed by modifying the setting of the reference information storage means 3.

Figure 26:
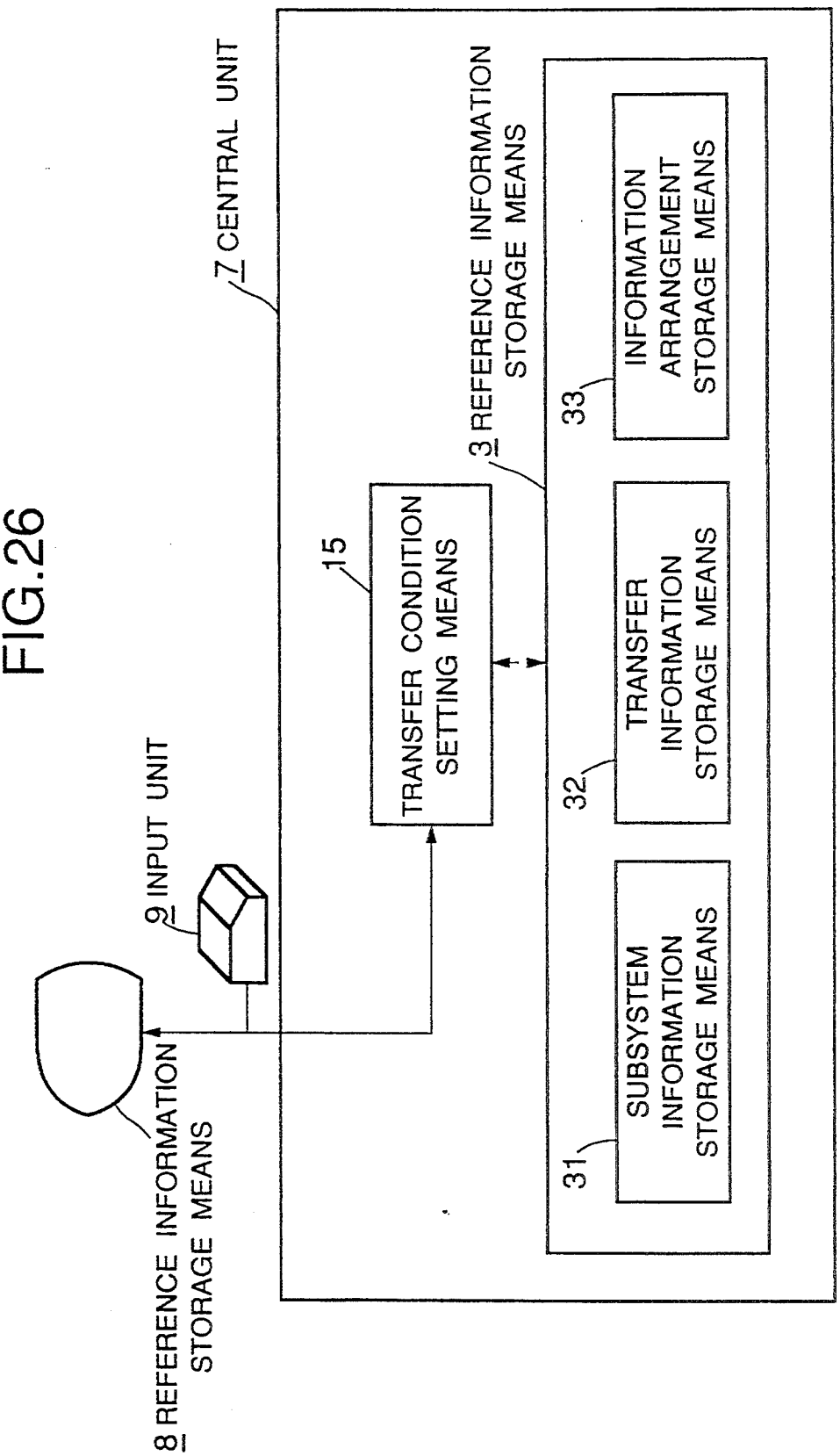
FIG. 26 is a block diagram showing an embodiment of the central unit equipped with a transfer condition setting means for the reference information storage means.

FIG. 26 is a block diagram showing an embodiment of the central unit equipped with a transfer condition setting means for the reference information storage means. The central unit 7 of this embodiment includes a transfer condition setting means 15 between the external display unit 8/input unit 9 and the internal reference information storage means 3. The reference information storage means 3 comprises a subsystem information storage means 31, a transfer information storage means 32 and an information arrangement storage means 33. The transfer condition setting means 15 is to preset the reference information, which is referred to in executing information transfer control, using the subsystem information storage means 31, the transfer information storage means 32 and the information arrangement storage means 33 in this order.

One example of such a system is an integrated building control system or the like in which respective systems for building management, security, etc. are integrated, as subsystems, into a central unit.

In the information transfer control arrangement wherein the information taken from the transferer subsystem is transferred by referring to the reference information which is preset, the reference information must not contain any error such as a contradiction. It is therefore required to provide a means for quickly detecting any error such as a contradiction at the time of setting the reference information, and setting it free from any such error. By setting the reference information using the subsystem information storage means 31, the transfer information storage means 32 and the information arrangement storage means 33 in this order, a contradiction between different sets of reference information dan be detected easily.

One example of the reference information stored in the storage means making up the reference information storage means 3 will now be explained.

The subsystem information storage means 31 stores the symbol information corresponding to the respective subsystems as shown in FIG. 9. Other storage means handle each subsystem using that symbol information. The gist of the subsystem information storage means 31 is to give each subsystem unique information standing for that subsystem. While the subsystems are set as the symbol information in this embodiment, codes, numbers, abbreviations or the like may be used instead.

The transfer information storage means 32 stores the corresponding relationship between transfer subsystems and transferee subsystem, as shown in FIG. 10, using the symbol information for the subsystems set by the subsystem information storage means 31. The transferer and transferee subsystems cannot be set freely. This is because transmission/reception of the transfer information is limited in light of match/mismatch of transmitted/received information handled by the subsystems between the information is to be transferred. The term "match" implies that the arrangement of information unit 5W1H for the transferer subsystem contains the arrangement of information unit 5W1H for the transferee subsystem. If the transferer and transferee subsystems was set freely, there would occur mismatch (contradiction) in the transmitted/received information during the transfer process, which might seriously affect the system.

Therefore, the following method is adopted here in order to avoid the burden exerted to check match/mismatch and any setting error at the time of setting the reference information. The transfer information storage means 32 is divided into a transfer executing information storage means for storing transfer executing information as shown in FIG. 10, and a transfer enable information storage means for storing transfer enable information as shown in FIG. 27. The information about the corresponding relation of transferee subsystems with respect to transferer subsystems, which is set in the transfer executing information storage means, and the enable information preset in the transfer enable information storage means in the same location are subjected to a logical operation. If the setting is not allowable, the result is informed to the operator. If the transferer is set, only one or more subsystems which may become transferees are informed to the operator by referring to the enable information in the transfer enable information s forage means. It is thus possible to avoid setting of contradictory reference information into the transfer executing information storage means.

The information arrangement storage means 33 is to set at least the information ("1"; presence of information, "0"; absence of information) shown in FIG. 11 (transferer information arrangement) and/or FIG. 12 (transferee information arrangement) each divided into the information units of 5W1H (When, Where, Who, What, Why, How). Here, the information arrangement for the transferee subsystem can also be set corresponding to only the location of "1" in the information arrangement for the transferee subsystem, so that contradictory reference information is prevented from being set into the information arrangement storage means 33.

Figure 28:
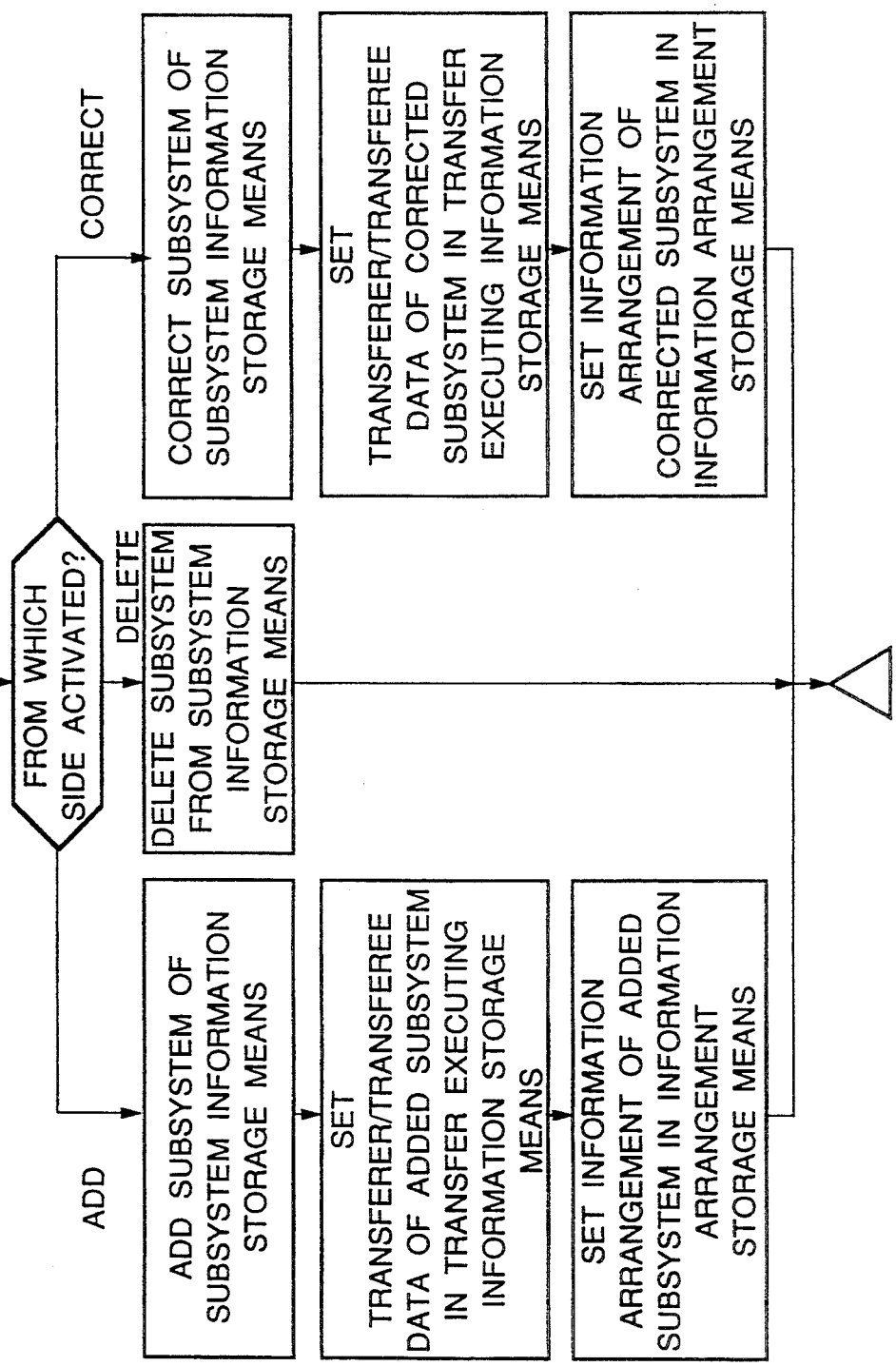
FIG. 28 is a flowchart showing the process sequence of the transfer condition setting means 15.

FIG. 28 is a flowchart showing the process sequence of the transfer condition setting means 15.

Processing selection: any of "add, delete and correct" processing for the reference information stored in any of the subsystem information storage means 31, the transfer information storage means 32 and the information arrangement storage means 33 is selected.

In case of specifying "add", at least the following process is executed.

Add subsystem to subsystem information storage means: the transfer condition setting means 15 adds symbol information of the subsystem to the subsystem information storage means 31. The transfer condition setting means 15 also automatically creates information setting areas for the added subsystem in both the transfer information storage means 32 and the information arrangement storage means 33.

Set transferer/transferee data of added subsystem: the transfer condition setting means 15 sets the transferee subsystem information corresponding to the transferer subsystem in the information setting area of the transfer information storage means 32 for the added subsystem.

Set information unit arrangement of added subsystem in information arrangement storage means: the transfer condition setting means 15 sets the information unit arrangement of 5W1H of the transferer and/or transferee subsystem for the added subsystem in the information arrangement storage means 33.

In ease of specifying "delete", at least the following process is executed.

Delete subsystem from information arrangement storage means: the transfer condition setting means 15 deletes the setting information of information unit arrangement of 5W1H for the deleted subsystem from the information arrangement storage means 33.

Delete subsystem from transfer executing information storage means: the transfer condition setting means 15 deletes the setting information of transferer and/or transferee for the deleted subsystem from the transfer information storage means 32.

Delete symbol information from subsystem information storage means: the setting of the symbol information for the deleted subsystem is deleted from the subsystem information storage means.

In case of specifying "correct", at least the following process is executed.

Correct subsystem in subsystem information storage means: the transfer condition setting means 15 corrects the symbol information of the subsystem set in the subsystem information storage means 31. Thus, the transfer condition setting means 15 deletes the symbol information of the subsystem before correction, and automatically sets the symbol information of the subsystem after correction in both the transfer information storage means 32 and the information arrangement storage means 33. If the subsystem is not corrected, the process flow skips to the next process.

Correct subsystem in transfer executing information storage means: the transfer condition setting means 15 sets the transferee subsystem information corresponding to the transferer subsystem in the transfer executing information storage means 32 ("1"→"0" or "0"→"1").

Correct information unit arrangement of subsystem in information arrangement storage means: the transfer condition setting means 15 sets the information unit arrangement of 5W1H for the transferer and/or transferee subsystem in the information arrangement storage means 33 ("1"→"0", "0"→"1").

With the foregoing processes, the reference information, such as information about the subsystem executing transfer and the corresponding relationship and about the respective information arrangements, can be easily added, deleted or corrected without causing a contradiction. Accordingly, extensibility and flexibility of the system are increased.

By adding steps of "inputting a password" and "judging the password" before the processes of setting, adding, deleting and correcting, the setting of the enable information into the transfer enable information storage means can be qualified for only a particular operator to do the setting operation. Addition of those steps contributes to remarkably reduce the occurrence of defects such as contradictions in the reference information during the information transfer control.

FIGS. 29, 30 and 31 are examples of screen display as indicated when the above setting steps are executed. These drawings illustrate display screens at the time of setting the reference information in the transfer information storage means 32 in the case that the transfer information storage means 32 is divided into the transfer executing information storage means and the transfer enable information storage means. In these examples, the executing information and the enable information are expressed in a single table. MM stands for the subsystem of meeting room management, GS guidance service, and BC building control monitor, respectively. The gist is not in division into the transfer executing information storage means and the transfer enable information storage means, but in displaying the enable information and the executing information for transfer in a discernible manner.

More specifically, the screen of FIG. 29 is indicated as a display screen for setting information in the transfer information storage means 32, and the operator is prompted to specify which one of the executing information and the enable information is to be corrected or set. In the screen of FIG. 29, when "1" is specified, the enable information is corrected or set. When "0" is specified, the executing information is corrected or set.

When "1" (correction of the enable information) is specified, the enable information is corrected or set in the following procedure.

1. The input request of a password is displayed as shown in FIG. 30 to prompt the operator to enter a predetermined password ○◊△□. If the entered password is wrong, the operator is allowed to reenter another one until the predetermined number of times. However, if the predetermined number of times is exceeded, this process is brought into an end. If the entered password is right, the enable information is corrected below.

2. The correction is made by changing "1" to "0", "0" or "1" to "-" in the positions in a lower table of FIG. 30 to be corrected. In the ease of correcting "1" to "-", since the transfer has been already executed between the corresponding subsystems, the information about the information unit arrangement of 5W1H for the transferer and transferee subsystems, which corresponds to the corrected position and is stored in the information arrangement storage means 33, is first deleted and the enable information in the specified position is then made unable, i.e., "-".

On the other hand, when "2" (correction of the execution information) is specified, the execution information is corrected in the following procedure.

As shown in FIG. 31, a password is not especially requested to be entered and the correction proceeds as follows. In the corrected positions in a lower table, "0" is corrected to "1" and "1" to "0". It must be here prearranged that the positions of "-" cannot be corrected.

After the above correction has been completed, the reference information in the other storage means will be corrected in a like manner. Thus, in the ease where information is not divided into the execution information and the enable information, the reference information will be corrected in the same procedure as mentioned above for correction of the execution information.

Figure 33:
FIG. 33 is a representation showing an example of screen display of the transfer condition setting means in which execute information and enable information are displayed separately.

The execution information and the enable information may be displayed separately in different tables. Examples of screen display in this ease are shown in FIGS. 32, 33 and 34. Correcting or setting operation is performed similarly to the examples of FIGS. 29, 30 and 31.

Furthermore, rather than displaying a table and correcting the same, it is alternatively possible to sequentially display the items required to be set and correct the reference information in accordance with the display. Operating examples of FIGS. 35, 36 and 37 will be explained below.

When "1" (correction of the enable information) is specified, the enable information is corrected in the following procedure.

1. A predetermined password ○ △□ is entered. If the entered password is wrong, the operator reenter another one. If it is right, the information for a next step is displayed.
2. Those subsystems which may become transferer subsystems are displayed. One transferer subsystem is specified out of the displayed subsystems.
3. Upon the specification, those subsystems which may become transferee subsystems are displayed along with the setting states of enable information for the transferee subsystems. Then, one transferee subsystem is specified based on the displayed setting states of the subsystems.
4. The enable information ("0" or "1") is set.

When "2" (correction of the executing information) is specified, the executing information is corrected in the following procedure.

1. Those subsystems which may become transferer subsystems are displayed. One transferer subsystem is specified out of the displayed subsystems.

Upon the specification, those subsystems which may become transferee subsystems are displayed along with the setting states of executing information for the transferee subsystems. Then, one transferee subsystem is specified based on the displayed setting states of the subsystems.

3. The executing information ("0" or "1") is set.

In this embodiment, when the steps of information setting are completed, the display screen is returned back to the initial one ("Which table is corrected (1: enable, 2: execution, 3: end) ?"). By repeating the above operations, the reference information of all the subsystems necessary for the information transfer control is set.

With this embodiment, the reference information to be referred to at the time of transferring the transfer information can be set without causing a contradiction. In particular, by setting the executing information and the enable information separately, the reference information is less likely to cause a contradiction.

FIG. 38 is a block diagram showing the functional configuration of an embodiment in which the information transfer system of the present invention is applied to a steel production system. The steel production system is one for putting materials such as iron ore, coke and lime into a blast furnace system 200, and melting those materials to produce pig iron. The blast furnace system 200 is controlled by a subsystem 201. The pig iron produced by the blast furnace system 200 is sent to a revolving furnace system 202 for producing steel. The revolving furnace system 202 is controlled by a subsystem 201. The subsystem 201 for controlling the blast furnace system 200 and the subsystem 201 for controlling the revolving furnace system 202 may be incorporated into a single subsystem if there is an allowance in processing capability of a CPU or the like.

The steel produced by the revolving furnace system 202 is turned to a slab in an ingot molding factory 203 controlled by a subsystem 201. The slab is heated by a soaking pit under control of a subsystem 201, and the heated slab is turned to a steel sheet by a blooming system 205 under control of a subsystem 201H.

Because the steel sheet is lowered in its temperature, it is heated by a steel sheet heating furnace 206 under control of a subsystem 201G, and then processed into a steel plate by a hot rolling system 207 under control of a subsystem 201F.

The steel plate is subjected to a continuous picking system 208 under control of a subsystem 201E for removing oxides from the plate surface, and then processed into a thin steel plate (sheet steel) by a cold rolling system 209 under control of a subsystem 201D.

The sheet steel is annealed by an annealing furnace system 210 under control of a subsystem 201C for material coordination, and then completed as a final produce by a finish rolling system 211 under control of a subsystem 201B.

Transmission of various information and the like among the above group of subsystems 201 and 201A to 210H are controlled by a subsystem 201A.

The information in this case also includes the contents of 5W1H, and is transferred with the subsystems and procedures shown in FIGS. 13 to 28.

By way of example, the steel material produced by the hot rolling system 207 is directly delivered as produces in some cases, and sent to the continuous picking system 208 in other cases. The role of information of 5W1H used as an instruction in this case will be explained below.

For instance, when an instruction that "the steel material (What) emerging from the hot rolling system 207 (Who) at 10 hr. (When) is transferred (How) to a delivery yard (Where), and the steel material (What) emerging from the hot rolling system 207 (Who) at 10:05 hr. (When) is transferred (How) to the continuous picking system 208 (Where) because it is a cold rolling product (Why)" is executed, the specifications required for the system can be implemented satisfactorily by using the items shown in FIG. 2 or 19 and transmitting the instruction in accordance with the procedure of the present invention.

Figure 39:
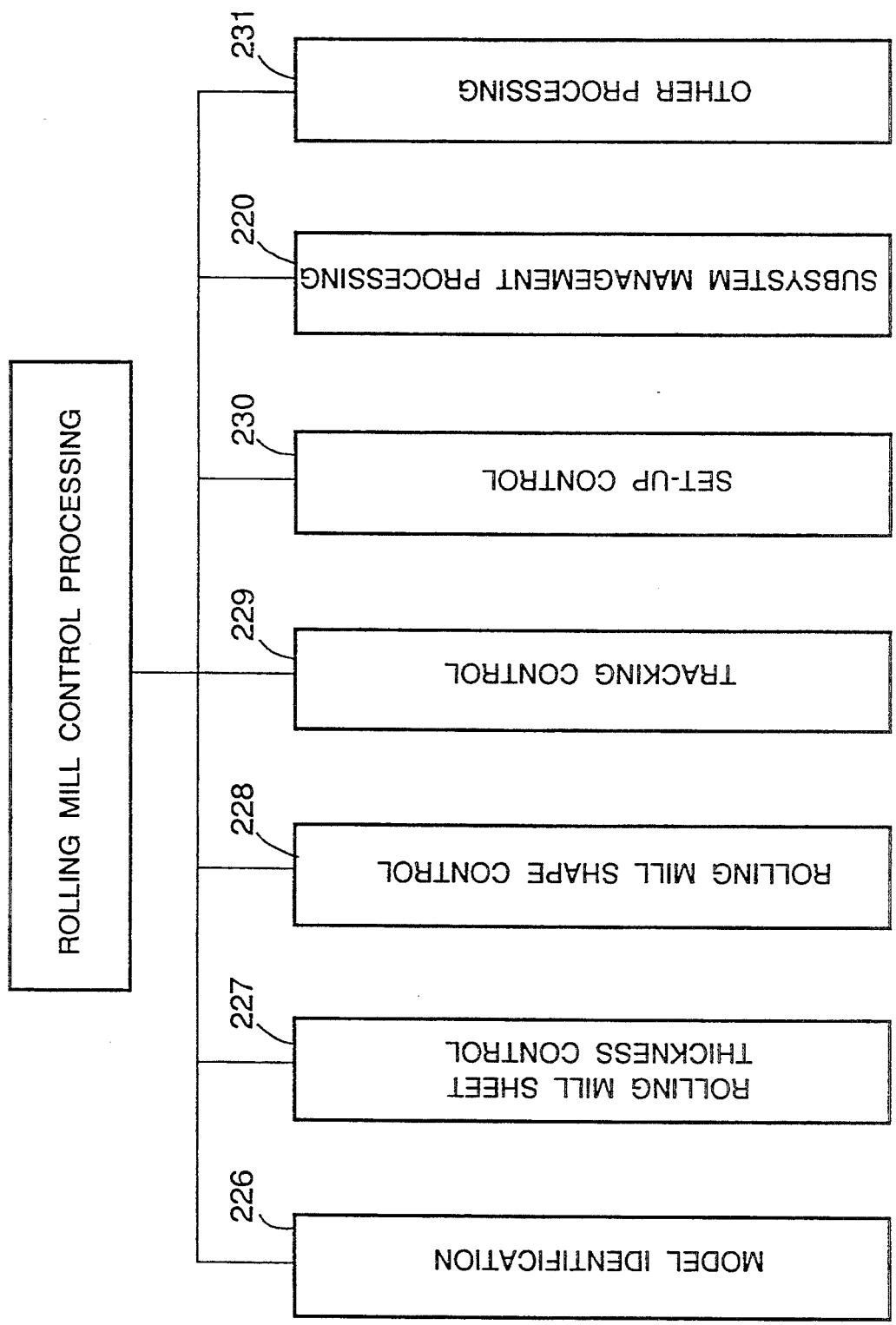
FIG. 39 is a block diagram showing an example of the configuration of processing to be carried out by a subsystem 201D for controlling a cold rolling system 209 of FIG. 38.

FIG. 39 is a block diagram showing an example of the configuration of processing to be carried out by the subsystem 201D for controlling the cold rolling system 209.

A rolling mill is a system varied complicatedly depending on rolling conditions such as types of steel, sorts of cooling and lubricating oil and sheet thickness. Therefore, a rolling mill control processing subsystem comprises a step of model identification 226 for creating a control model of the rolling mill as a control object for purpose of precise control, a step of rolling mill sheet thickness control 227 for controlling the steel material into an initial sheet thickness, a step of a rolling mill shape control 228 for controlling an axial shape of the rolled material and a flexture of rolling rolls, a step of tracking control 229 for grasping states of the rolled material passing respective stands to utilize the grasped result in the control, a step of set-up control 230 for presetting an operating point of the rolling mill with high non-linearity, a step of subsystem management processing 220 for controlling those control steps so as to operate in harmony, and a step of other processing 231 to carry out control, input/output and so on for a workstation or the like associated with the subsystem. Note that the sheet thickness control 227 and the shape control 228 each perform feedback control in the vicinity of the operating point determined by the set-up control 230.

The role of 5W1H in this subsystem will now be explained more specifically. The rolling mill in this example is a tandem mill comprising a plurality of stands.

For instance, when an instruction that "in order to reduce (Why) abrupt disturbance (What) of the steel material emerging from the first stand (Who) at 10 hr. (When), the magnitude and phase of the disturbance is transferred (How) to the second stand (Where), and the control for canceling the magnitude and phase of the disturbance of the steel material sent from the first stand (Where) to the second stand (Who) after 50 msec (When) is performed (How)" is executed, the specifications required for the system can be implemented satisfactorily by using the items shown in FIG. 2 or 19 and transmitting the instruction in accordance with the procedure of the present invention.

Figure 40:
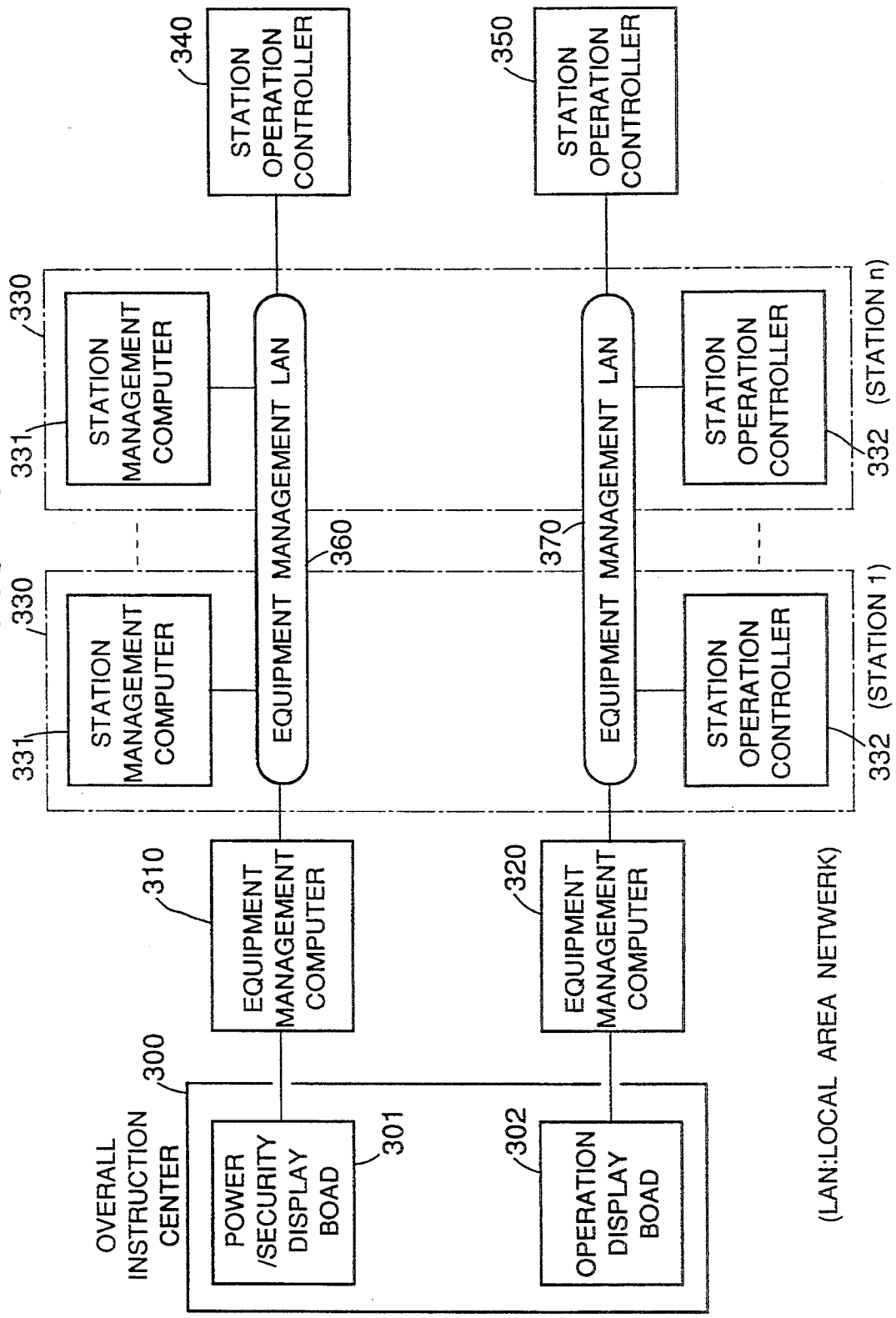
FIG. 40 is a block diagram showing the functional configuration of an embodiment in which the information transfer system of the present invention is applied to a train operation management/control system.

FIG. 40 is a block diagram showing the functional configuration of an embodiment in which the information transfer system of the present invention is applied to a train operation management/control system. Each station 330 and a central overall instruction center 300 are interconnected by exclusive transmission loops 360 and 370 for equipment management LAN and operation management LAN separated from each other.

The equipment management LAN comprises a central equipment management computer 310, a group of station management controllers 331 installed in every stations 330, and a substation remote controller 340 for managing power, station equipment, security (prevention of disasters), etc.

The operation management LAN comprises a central operation management computer 320, a group of station operation controllers 332 installed in every stations 330, and a base operation controller 350.

The central operation management computer 320 supervises monitors installed in every stations, and provides information to terminal units (not shown) in respective territories connected the operation management computer 320. The station operation controllers 332 automates control for broadcasting and guidance, and also transmits data to trains. The base operation controller 350 controls operation of trains in the train base.

The information in this case also includes the contents of 5W1H, and is transferred with the subsystems and procedures shown in FIGS. 13 to 28. The following is a description of practical examples for each of the equipment management LAN and the operation management LAN.

As one example for the equipment management LAN, transmission of information about station illuminating equipment will be explained. The station management controller 331 manages the working time of illumination in the station. Based on the working time of illumination transmitted from each of the station management controllers 331, the central equipment management computer 310 manages the remaining service life of illumination equipment for each station, the percentage of amount of power consumed by the illumination versus the total amount, etc., and informs to each station of replacement of the illumination equipment, saving of the illumination power, etc. The role of information in the format of 5W1H used as an instruction in this case will now be described.

For instance, information in the format of 5W1H that "the average working time (What) of illumination equipment installed in environment Z (Where) in the A station (Who) on ○ (month), Δ (day) (When)" (the environment includes the outdoor, indoor, platform or the like) is transmitted from the station management controller 331 of the A station to the information transfer control means of the present invention using the items shown in FIG. 2 or 19. On the other hand, the information transfer control means transmits the information to the central equipment management computer 310 based on the reference information stored in advance. Then, the central equipment management computer 310 determines the remaining service life from the power consumption and the expected service life under the environment Z, etc., and transmits it as information in the format of 5W1H that "the remaining service life (What) of the illumination equipment installed in environment Z (Where) in the A station (Who) as of ○ (month), Δ (day) (When) is ⊙⊙⊙⊙ hours (How)" to the information transfer control means using the items shown in FIG. 2 or 19 in accordance with the procedure of the present invention. The information transfer control means informs that information to the station management controller 331 of the A station. In addition, it is also possible to compare the power consumption of the illumination equipment with that under the similar environment in the other station, and inform the need of power saving to the A station in a like manner.

Next, as one example for the operation management LAN, transmission of information about train passage at each station will be explained.

For instance, information in the format of 5W1H that "the up (What) XX train (Who) has passed (How) the A station (Where) at ○:Δ hr. (When)" is transmitted from the station operation controller 332 of the A station to the information transfer control means of the present invention using the items shown in FIG. 2 or 19 in accordance with the procedure of the present invention. The information transfer control means transmits that information to the central operation management computer 332 based on the reference information stored in advance, and also transmits that information to other B, C or like stations stored in the reference information in a like manner. This technique enables it to transmit the information about train running to each station downstream in the running direction of the train, and to sequentially grasp and manage the running state of the train by the central operation management computer 320.

Figure 41:
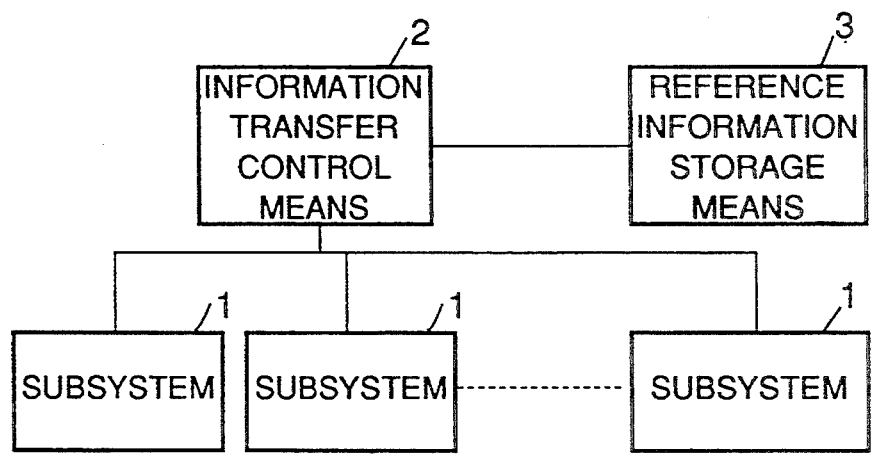
FIG. 41 is a block diagram showing the functional configuration of an embodiment of the information transfer system in which the transfer information is transferred by adding a pattern code thereto.

FIG. 41 is a block diagram showing the functional configuration of an embodiment of the information transfer system in which the transfer information is transferred by adding a pattern code thereto. This information transfer system comprises subsystems 1, an information transfer control means 2, and a reference information storage means 3. In this embodiment, the information transfer control means 2 and the reference information storage means 3 may be disposed between the subsystems 1 and a communication line.

Figure 42:
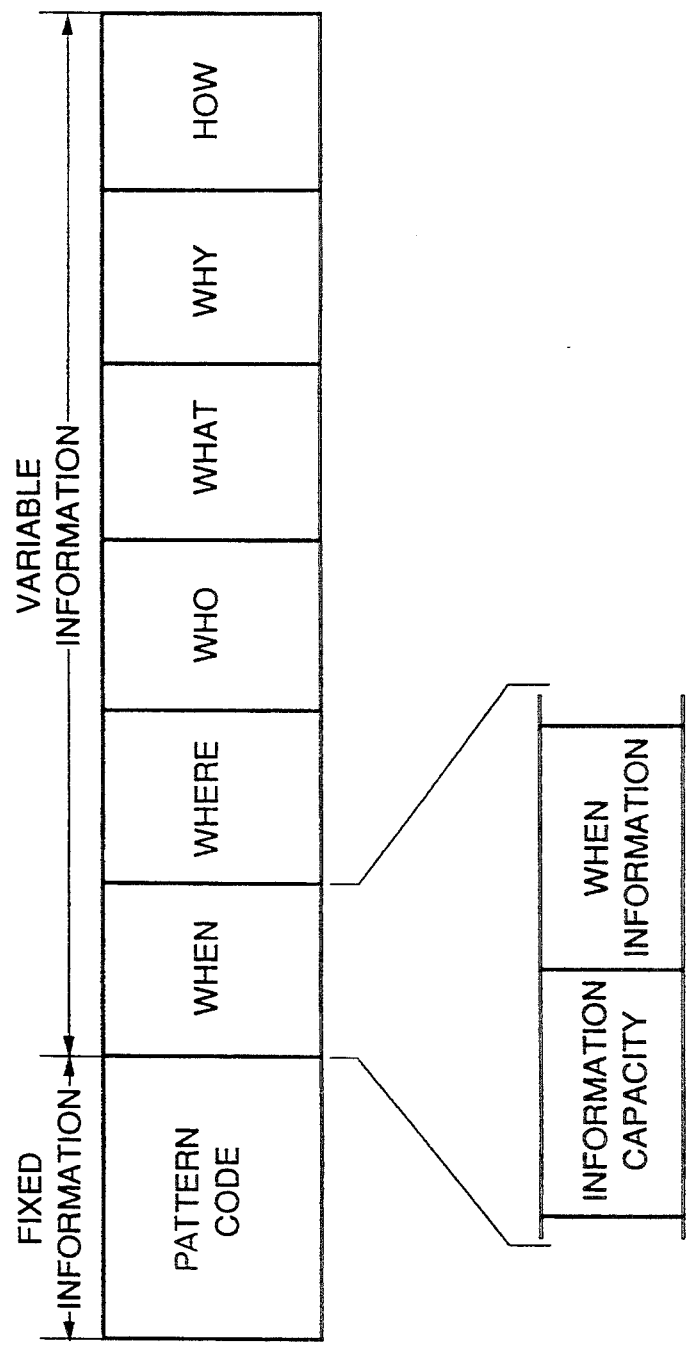
FIG. 42 is a diagram showing an example of transfer information with at least a pattern code added to fixed information.

FIG. 42 is a diagram showing an example of transfer information with at least a pattern code added to fixed information. The format of transfer information is the same as the example of FIG. 2 for variable information, while at least a pattern code is added to fixed information.

Examples of information stored in the reference information storage means 3 are illustrated in FIGS. 43, 44 and 45. FIG. 43 is a diagram showing an example of information arrangement patterns storing the corresponding relationship between pattern codes and information arrangements of 5W1H. As to an information arrangement pattern storage means (FIG. 43), considering the pattern code as a bit pattern representative of the arrangement of 5W1H as shown in FIG. 43, the information arrangement is involved in the pattern code and thus can be omitted by expressing the value succeeding to "X" in hexadecimal. For easy understanding, this embodiment will be explained in connection with the information arrangement pattern storage means.

FIG. 44 is a diagram showing an example of transfer patterns storing the relationship in information transfer between pattern codes. FIG. 45 is a diagram showing an example of subsystem patterns storing the relationship between pattern codes and subsystems.

Consider now the case of controlling information transfer with the subsystems and procedure shown in FIGS. 13 to 16 using the reference information of FIGS. 43, 44 and 45. In this case, FIG. 13 also shows the configuration of the information transfer control means 2.

The following is a description of the process sequence of information input processing 21 shown in FIG. 14.

Take in transfer information: the transfer information having the format shown in FIG. 2 and stored in the first information storage table 76 is taken-in.

Store into preselected table: the taken-in information is stored into the information input table 20.

Start information decision processing: information decision processing is started.

The above is steps of the information input processing 21. Next, the following is a description of the process sequence of information decision processing 22.

Check taken-in information: the information stored into the information input table 20 is checked as to whether it is normal or not, using the information stored in the reference information storage means 3 (FIG. 43) or the pattern code information.

Normal ?: As a result of the check, the process flow shifts to a step of "starting information transfer processing" if normal, and shifts to a step of "outputting an abnormal message" if not normal.

Start information transfer processing: information transfer processing 23 is started.

Output abnormal message: a message is outputted and displayed depending on the abnormal state.

Next, the following is a description of the process sequence of the information transfer processing 23 shown in FIG. 16.

Determine information transferee: the information transferee pattern code is searched using the reference information storage means 3 (FIG. 44), and the transferee subsystem is determined using the reference information storage means 3 (FIG. 45).

Rearrange and transfer information: the information arrangement for the transferee subsystem is determined from the transferee pattern code directly or the reference information storage means 3 (FIG. 43) using the transferee pattern code. Then, the information in the information input table 20 is rearranged to the information arrangement for the determined transferee subsystem, followed by storing it at a corresponding location of the second information storage table 77 shown in FIG. 17. This step is executed for all the subsystems associated with the transferee pattern code.

No other transferees ?: if there are no other transferee pattern codes, the process is ended and, if there is any other transferee pattern code, the process is continued by returning to the first step of "determining the information transferee".

With the above operation of the information transfer control means 2, it is possible to realize information transfer between subsystems using the pattern code prepared by patterning the information arrangement of 5W1H. In the case of this embodiment, the information arrangement can be involved in the pattern code, resulting in advantages of reducing storage capacity for the reference information and simplifying the transfer information.

According to the present invention, there is provided the information transfer control means which grasps the information arrangements for the information transferer subsystem and the information transferee subsystem, and rearranges the arrangement of the information having been transferred to the arrangement of the information to be transferred. As a result, various subsystems can be combined with each other to achieve a universal information transfer system.

We claim:

1. An information transfer system comprising:
   at least three subsystems communicating with each other through an information transfer control means using transfer information which contains an information unit common to all information handled by said subsystems
   wherein said information transfer control means transfers at least the common information unit in the transfer information, received from each of said subsystems, to another one of said at least three subsystems in accordance with reference information stored in a reference information storage means, and
   said transfer information containing an information unit common to all information handled by said subsystems, said information unit containing at least an information unit of 5W1H (When, Where, Who, What, Why, How).

2. An information transfer system comprising:
   at least three subsystems communicating with each other through an information transfer control means using transfer information which contains an information unit common to all information handled by said subsystems,
   wherein said information control means includes an information transfer controller and reference information storage means, and transfers at least the common information unit in the transfer information, received from one of said subsystems operating as a transferer subsystem, to another one of said subsystems operating as a transferee subsystem determined based on reference information stored in said reference information storage means, and
   said transfer information containing an information unit common to all information handled by said subsystems, said information unit containing at least an information unit of 5W1H (When, Where, Who, What, Why, How).

3. An information transfer system comprising:
   at least three subsystems having a vertical hierarchical relationship with at least one hierarchy, and communicating with each other through an information transfer control means using transfer information which contains an information unit common to all information handled by said at least three subsystems,
   wherein said information transfer control means includes an information transfer controller and a reference information storage means, and transfers at least the common information unit in the transfer information, received from one of said subsystems operating as a transferer subsystem, to another one of said subsystems operating as a transferee subsystem determined based on reference information stored in said reference information storage means, and said transfer information containing an information unit common to all information handled by said subsystems, said information unit containing at least an information unit of 5W1H (When, Where, Who, What, Why, How).

4. An information transfer system comprising:

an integrated system in which at least three systems communicating with each other through an information transfer control means using transfer information, which contains an information unit common to all information handled by said systems, are integrated as subsystems into a central unit, wherein said information transfer control means includes an information transfer controller and a reference information storage means, and transfers at least the common information unit in the transfer information, received from one of said subsystems operating as a transferer system, to another one of said subsystems operating as a transferee system determined based on reference information stored in said reference information storage means, and said transfer information containing an information unit common to all information handled by said subsystems, said information unit containing at least an information unit of 5W1H (When, Where, Who, What, Why, How).

5. An information transfer system comprising:

an integrated system in which at least three systems communicating with each other through an information transfer control means using transfer information, which contains an information unit common to all information handled by said systems, are interconnected as subsystems through a communication line, wherein said information transfer control means includes an information transfer controller and a reference information storage means, and transfers at least the common information unit in the transfer information, received from at least one of said subsystems operating as a transferer subsystem, to at least one of said subsystems operating as a transferee subsystem determined based on reference information stored in said reference information storage means, and said transfer information containing an information unit common to all information handled by said subsystems, said information unit containing at least an information unit of 5W1H (When, Where, Who, What, Why, How).

6. An information transfer system for building management comprising:

a building management integrated building control system in which at least three systems for building management, security, etc. communicating with each other through an information transfer control means using transfer information, which contains an information unit common to all information handled by said systems, are integrated as subsystems into a central unit, wherein said information transfer control means includes an information transfer controller and a reference information storage means, and includes means for rearranging at least the common information unit in the transfer information received from one of said subsystems operating as a transferer subsystem based on reference information of at least one of said subsystems operating as a transferee subsystem stored in said reference information storage means, and transferring the rearranged information to said transferee subsystem, and said transfer information containing an information unit common to all information handled by said subsystems, said information unit containing at least an information unit of 5W1H (When, Where, Who, What, Why, How).

7. An information transfer system comprising:

at least three subsystems communicating with each other through an information transfer control means using transfer information which contains an information unit common to all information handled by said subsystems wherein said information transfer control means transfers at least the common information unit in the transfer information, received from each of said subsystems, to another one of said at least three subsystems in accordance with reference information stored in a reference information storage means, and said transfer information containing an information unit common to all information handled by said subsystems which comprises fixed information having a header which contains at least the information arranged to represent the presence or absence of each item of an information unit of 5W1H (When, Where, Who, What, Why, How), and variable information containing concrete information for at least those items of the information unit for which the presence of information is indicated by said header.

8. An information transfer system comprising:

at least three subsystems communicating with each other through an information transfer control means using transfer information which contains an information unit common to all information handled by said subsystems, wherein said information control means includes an information transfer controller and reference information storage means, and transfers at least the common information unit in the transfer information, received from one of said subsystems operating as a transferer subsystem, to another one of said subsystems operating as a transferee subsystem determined based on reference information stored in said reference information storage means, and said transfer information containing an information unit common to all information handled by said subsystems which comprises fixed information having a header which contains at least the information arranged to represent the presence or absence of each item of an information unit of 5W1H (When, Where, Who, What, Why, How), and variable information containing concrete information for at least those items of the information unit for which the presence of information is indicated by said header.

9. An information transfer system comprising:

at least three subsystems having a vertical hierarchical relationship with at least one hierarchy, and communicating with each other through an information transfer control means using transfer information which contains an information unit common to all information handled by said at least three subsystems, wherein said information transfer control means includes an information transfer controller and a reference information storage means, and transfers at least the common information unit in the transfer information, received from one of said subsystems operating as a transferer subsystem, to another one of said subsystems operating as a transferee subsystem determined based on reference information stored in said reference information storage means, and said transfer information containing an information unit common to all information handled by said subsystems which comprises fixed information having a header which contains at least the information arranged to represent the presence or absence of each item of an information unit of 5W1H (When, Where, Who, What, Why, How), and variable information containing concrete information for at least those items of the information unit for which the presence of information is indicated by said header.

10. An information transfer system comprising:

an integrated system in which at least three systems communicating with each other through an information transfer control means using transfer information, which contains an information unit common to all information handled by said systems, are integrated as subsystems into a central unit, wherein said information transfer control means includes an information transfer controller and a reference information storage means, and transfers at least the common information unit in the transfer information, received from one of said subsystems operating as a transferer system, to another one of said subsystems operating as a transferee system determined based on reference information stored in said reference information storage means, and said transfer information containing an information unit common to all information handled by said subsystems which comprises fixed information having a header which contains at least the information arranged to represent the presence or absence of each item of an information unit of 5W1H (When, Where, Who, What, Why, How), and variable information containing concrete information for at least those items of the information unit for which the presence of information is indicated by said header.

11. An information transfer system comprising:

an integrated system in which at least three systems communicating with each other through an information transfer control means using transfer information, which contains an information unit common to all information handled by said systems, are interconnected as subsystems through a communication line, wherein information transfer control means includes an information transfer controller and a reference information storage means, and transfers at least the common information unit in the transfer information, received from at least one of said subsystems operating as a transferer subsystem, to at least one of said subsystems operating as a transferee subsystem determined based on reference information stored in said reference information storage means, and said transfer information containing an information unit common to all information handled by said subsystems which comprises fixed information having a header which contains at least the information arranged to represent the presence or absence of each item of an information unit of 5W1H (When, Where, Who, What, Why, How), and variable information containing concrete information for at least those items of the information unit for which the presence of information is indicated by said header.

12. An information transfer system for building management comprising:

a building management integrated building control system in which at least three systems for building management, security, etc. communicating with each other through an information transfer control means using transfer information, which contains an information unit common to all information handled by said systems, are integrated as subsystems into a central unit, wherein said information transfer control means includes an information transfer controller and a reference information storage means, and includes means for rearranging at least the common information unit in the transfer information received from one of said subsystems operating as a transferer subsystem based on reference information of at least one of said subsystems operating as a transferee subsystem stored in said reference information storage means, and transferring the rearranged information to said transferee subsystem, and said transfer information containing an information unit common to all information handled by said subsystems which comprises fixed information having a header which contains at least the information arranged to represent the presence or absence of each item of an information unit of 5W1H (When, Where, Who, What, Why, How), and variable information containing concrete information for at least those items of the information unit for which the presence of information is indicated by said header.

13. An information transfer system comprising:

at least three subsystems communicating with each other through an information transfer control means using transfer information which contains an information unit common to all information handled by said subsystems, wherein said information control means includes an information transfer controller and reference information storage means, and transfers at least the common information unit in the transfer information, received from one of said subsystems operating as a transferer subsystem, to another one of said subsystems operating as a transferee subsystem determined based on reference information stored in said reference information storage means, and wherein the reference information storage means comprises:

transfer pattern storage means for storing a relationship between information transferer pattern codes and information transferee pattern codes, and subsystem pattern storage means for storing a relationship between said pattern codes and said subsystems, wherein the pattern codes are formed on the basis of transfer information containing an information unit common to all information handled by the subsystems, and wherein the common information unit, on the basis of which the pattern codes are formed, is in a format of 5W1H (When, Where, Who, What, Why, How).

14. An information transfer system comprising:

at least three subsystems having a vertical hierarchical relationship with at least one hierarchy, and communicating with each other through an information transfer control means using transfer information which contains an information unit common to all information handled by said at least three subsystems, wherein said information transfer control means includes an information transfer controller and a reference information storage means, and transfers at least the common information unit in the transfer information, received from one of said subsystems operating as a transferer subsystem, to another one of said subsystems operating as a transferee subsystem determined based on reference information stored in said reference information storage means, and wherein the reference information storage means comprises:

transfer pattern storage means for storing a relationship between information transferer pattern codes and information transferee pattern codes, and subsystem pattern storage means for storing a relationship between said pattern codes and said subsystems, wherein the pattern codes are formed on the basis of transfer information containing an information unit common to all information handled by the subsystems, and wherein the common information unit, on the basis of which the pattern codes are formed, is in a format of 5W1H (When, Where, Who, What, Why, How).

15. An information transfer system comprising:

an integrated system in which at least three systems communicating with each other through an information transfer control means using transfer information, which contains an information unit common to all information handled by said systems, are integrated as subsystems into a central unit, wherein said information transfer control means includes an information transfer controller and a reference information storage means, and transfers at least the common information unit in the transfer information, received from one of said subsystems operating as a transferer system, to another one of said subsystems operating as a transferee system determined based on reference information stored in said reference information storage means, and wherein the reference information storage means comprises:

transfer pattern storage means for storing a relationship between information transferer pattern codes and information transferee pattern codes, and subsystem pattern storage means for storing a relationship between said pattern codes and said subsystems, wherein the pattern codes are formed on the basis of transfer information containing an information unit common to all information handled by the subsystems, and wherein the common information unit, on the basis of which the pattern codes are formed, is in a format of 5W1H (When, Where, Who, What, Why, How).

16. An information transfer system comprising:

an integrated system in which at least three systems communicating with each other through an information transfer control means using transfer information, which contains an information unit common to all information handled by said systems, are interconnected as subsystems through a communication line, wherein said information transfer control means includes an information transfer controller and a reference information storage means, and transfers at least the common information unit in the transfer information, received from at least one of said subsystems operating as a transferer subsystem, to at least one of said subsystems operating as a transferee subsystem determined based on reference information stored in said reference information storage means, and wherein the reference information storage means comprises:

transfer pattern storage means for storing a relationship between information transferer pattern codes and information transferee pattern codes, and subsystem pattern storage means for storing a relationship between said pattern codes and said subsystems, wherein the pattern codes are formed on the basis of transfer information containing an information unit common to all information handled by the subsystems, and wherein the common information unit, on the basis of which the pattern codes are formed, is in a format of 5W1H (When, Where, Who, What, Why, How).

17. An information transfer system for building management comprising:

a building management integrated building control system in which at least three systems for building management, security, etc. communicating with each other through an information transfer control means using transfer information, which contains an information unit common to all information handled by said systems, are integrated as subsystems into a central unit, wherein said information transfer control means includes an information transfer controller and a reference information storage means, and includes means for rearranging at least the common information unit in the transfer information received from one of said subsystems operating as a transferer subsystem based on reference information of at least one of said subsystems operating as a transferee subsystem stored in said reference information storage means, and transferring the rearranged information to said transferee subsystem, and wherein the reference information storage means comprises:

transfer pattern storage means for storing a relationship between information transferer pattern codes and information transferee pattern codes, and subsystem pattern storage means for storing a relationship between said pattern codes and said subsystems, wherein the pattern codes are formed on the basis of transfer information containing an information unit common to all information handled by the subsystems, and wherein the common information unit, on the basis of which the pattern codes are formed, is in a format of 5W1H (When, Where, Who, What, Why, How).

18. An information transfer system comprising:

at least three subsystems communicating with each other through an information transfer control means using transfer information which contains an information unit common to all information handled by said subsystems, wherein said information control means includes an information transfer controller and reference information storage means, and transfers at least the common information unit in the transfer information, received from one of said subsystems operating as a transferer subsystem, to another one of said subsystems operating as a transferee subsystem determined based on reference information stored in said reference information storage means, wherein at least two of said subsystems have an information structure of information handled by the transferee subsystem which are different from one another, wherein said reference information storage means includes reference information with regard to the information structure of each of the subsystems, wherein said information transfer control means includes means for rearranging the common information unit in the transfer information between the transferer subsystem and the transferee subsystem based upon said reference information regarding the information structure of the transferer subsystem and the transferee subsystem if the reference information indicates that the transferer subsystem and the transferee subsystem have a different information structure from one another, and wherein the information unit is arranged within an information structure of 5W1H (When, Where, Who, What, Why, How).

19. An information transfer system comprising:

at least three subsystems having a vertical hierarchical relationship with at least one hierarchy, and communicating with each other through an information transfer control means using transfer information which contains an information unit common to all information handled by said at least three subsystems, wherein said information transfer control means includes an information transfer controller and a reference information storage means, and transfers at least the common information unit in the transfer information, received from one of said subsystems operating as a transferer subsystem, to another one of said subsystems operating as a transferee subsystem determined based on reference information stored in said reference information storage means, wherein at least two of said subsystems have an information structure of information handled by the transferee subsystem which are different from one another, wherein said reference information storage means includes reference information with regard to the information structure of each of the subsystems, wherein said information transfer control means includes means for rearranging the common information unit in the transfer information between the transferer subsystem and the transferee subsystem based upon said reference information regarding the information structure of the transferer subsystem and the transferee subsystem if the reference information indicates that the transferer subsystem and the transferee subsystem have a different information structure from one another, and wherein the information unit is arranged within an information structure of 5W1H (When, Where, Who, What, Why, How).

20. An information transfer system comprising:

an integrated system in which at least three systems communicating with each other through an information transfer control means using transfer information, which contains an information unit common to all information handled by said systems, are integrated as subsystems into a central unit, wherein said information transfer control means includes an information transfer controller and a reference information storage means, and transfers at least the common information unit in the transfer information, received from one of said subsystems operating as a transferer system, to another one of said subsystems operating as a transferee system determined based on reference information stored in said reference information storage means, wherein at least two of said subsystems have an information structure of information handled by the transferee subsystem which are different from one another, wherein said reference information storage means includes reference information with regard to the information structure of each of the subsystems, wherein said information transfer control means includes means for rearranging the common information unit in the transfer information between the transferer subsystem and the transferee subsystem based upon said reference information regarding the information structure of the transferer subsystem and the transferee subsystem if the reference information indicates that the transferer subsystem and the transferee subsystem have a different information structure from one another, and wherein the information unit is arranged within an information structure of 5W1H (When, Where, Who, What, Why, How).

21. An information transfer system comprising:

an integrated system in which at least three systems communicating with each other through an information transfer control means using transfer information, which contains an information unit common to all information handled by said systems, are interconnected as subsystems through a communication line, wherein information transfer control means includes an information transfer controller and a reference information storage means, and transfers at least the common information unit in the transfer information, received from at least one of said subsystems operating as a transferer subsystem, to at least one of said subsystems operating as a transferee subsystem determined based on reference information stored in said reference information storage means, wherein at least two of said subsystems have an information structure of information handled by the transferee subsystem which are different from one another, wherein said reference information storage means includes reference information with regard to the information structure of each of the subsystems, wherein said information transfer control means includes means for rearranging the common information unit in the transfer information between the transferer subsystem and the transferee subsystem based upon said reference information regarding the information structure of the transferer subsystem and the transferee subsystem if the reference information indicates that the transferer subsystem and the transferee subsystem have a different information structure from one another, and wherein the information unit is arranged within an information structure of 5W1H (When, Where, Who, What, Why, How).

22. An information transfer system for building management comprising:

a building management integrated building control system in which at least three systems for building management, security, etc. communicating with each other through an information transfer control means using transfer information, which contains an information unit common to all information handled by said systems, are integrated as subsystems into a central unit, wherein said information transfer control means includes an information transfer controller and a reference information storage means, and includes means for rearranging at least the common information unit in the transfer information received from one of said subsystems operating as a transferer subsystem based on reference information of at least one of said subsystems operating as a transferee subsystem stored in said reference information storage means, and transferring the rearranged information to said transferee subsystem, wherein at least two of said subsystems have an information structure of information handled by the transferee subsystem which are different from one another, wherein said reference information storage means includes reference information with regard to the information structure of each of the subsystems, wherein said information transfer control means includes means for rearranging the common information unit in the transfer information between the transferer subsystem and the transferee subsystem based upon said reference information regarding the information structure of the transferer subsystem and the transferee subsystem if the reference information indicates that the transferer subsystem and the transferee subsystem have a different information structure from one another, and wherein the information unit is arranged within an information structure of 5W1H (When, Where, Who, What, Why, How).

23. Information transfer control means comprising:

a plurality of subsystems coupled to one another through a communication means;

information input processing means to receive transfer information having a first arrangement of information from one of said plurality of subsystems operating as a transferer subsystem or from a terminal unit through said communication means, an input information buffer coupled to said information input processing means for loading said transfer information received by said input processing means, transferee extraction processing means, coupled to said input information buffer, to extract, from said transfer information loaded in said input information buffer, need-of-transfer information which specifies whether or not said transfer information is to be transferred to a location other than a predetermined destination, transferee decision processing means to determine a transferee subsystem from among said plurality of subsystems based on said extracted need-of-transfer information and reference information stored in a reference information storage means, means for rearranging said transfer information to a second information arrangement required for said transferee subsystem, based on the reference information stored in said reference information storage means, first information transfer processing means to transfer said transfer information to said predetermined destination, and second information transfer means to transfer said rearranged transfer information to said transferee subsystem.

24. Information transfer control means comprising:

a plurality of subsystems coupled to one another through a communication means;

information input processing means to receive transfer information from one of said plurality of subsystems operating as a transferer subsystem or from a terminal unit through said communication means, an input information buffer coupled to said information input processing means for loading said transfer information received by said input processing means, transferee extraction processing means, coupled to said input information buffer, to extract, from said transfer information loaded in said input information buffer, need-of-transfer information which specifies whether or not said transfer information is to be transferred to a location other than a predetermined destination, transferee decision processing means to determine a transferee subsystem from among said plurality of subsystems based on said extracted need-of-transfer information and reference information stored in a reference information storage means, information transfer processing means to transfer said transfer information to said predetermined destination, and to said transferee subsystem.

25. A transfer condition setting method for an information transfer system having at least three subsystems communicating with each other through an information transfer control means using transfer information which contains an information unit common to all information handled by said subsystems, wherein said information control means includes an information transfer controller and reference information storage means, and transfers at least the common information unit in the transfer information, received from one of said subsystems operating as a transferer subsystem, to another one of said subsystems operating as a transferee subsystem determined based on reference information stored in said reference information storage means, and wherein said information transfer system includes transfer condition setting means to set, add, correct or delete the reference information stored in said reference information storage means, said method comprising:

setting, adding or correcting of the reference information in said reference information storage means using a subsystem information storage means, a transferer information storage means and an information arrangement storage means in this order, and deleting of said reference information in a reversed order to the order of setting, adding or correcting.

26. A transfer condition setting method for an information transfer system having at least three subsystems communicating with each other through an information transfer control means using transfer information which contains an information unit common to all information handled by said subsystems, wherein said information control means includes an information transfer controller and reference information storage means, and transfers at least the common information unit in the transfer information, received from one of said subsystems operating as a transferer subsystem, to another one of said subsystems operating as a transferee subsystem determined based on reference information stored in said reference information storage means, and wherein said information transfer system includes transfer condition setting means to set, add, correct or delete the reference information stored in said reference information storage means, said method comprising:

storing the contents of setting, addition, correction or deletion of the reference information in said reference information storage means by separating at least one storage means of a subsystem information storage means, a transfer information storage means and an information arrangement storage means into enable information storage means and execution information storage means;

subjecting the reference information to be set and said stored enable information to a logical operation; and storing a result obtained from the logical operation as executing information in said executing information storage means to be used as the reference information.

27. An information transfer system comprising:

at least three subsystems communicating with each other through an information transfer control means using transfer information which contains information units in a format of 5W1H (When, Where, Who, What, Why, How) common to all information handled by said subsystems, wherein at least two of said subsystems have an information structure of information handled by the subsystems which are different from one another, wherein said information control means includes an information transfer controller and reference information storage means, said reference information storage means including reference information with regard to the information structure of each of said subsystems, and wherein said information control means includes means for transferring at least the common information units in the transfer information, received from one of said subsystems operating as a transferer subsystem, to another one of said subsystems operating as a transferee subsystem determined based on reference information stored in said reference information storage means, and wherein said information transfer control means further includes means for rearranging the common information units in the transfer information between the transferer subsystem and the transferee subsystem based upon said reference information regarding the information structure of the transferer subsystem and the transferee subsystem if the reference information indicates that the transferer subsystem and the transferee subsystem have a different information structure from one another.

28. An information transfer system according to claim 27, wherein the subsystems are arranged in a vertical hierarchical arrangement with at least one hierarchy.

* * * * *